United States Patent
Ando et al.

(10) Patent No.: US 12,139,174 B2
(45) Date of Patent: Nov. 12, 2024

(54) VEHICLE PLATFORM, AUTONOMOUS DRIVING SYSTEM, AND VEHICLE CONTROL INTERFACE BOX

(71) Applicant: TOYOTA JIDOSHA KABUSHIKI KAISHA, Toyota (JP)

(72) Inventors: Eisuke Ando, Nagoya (JP); Toshikazu Hioki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/931,637

(22) Filed: Sep. 13, 2022

(65) Prior Publication Data

US 2023/0116293 A1 Apr. 13, 2023

(30) Foreign Application Priority Data

Sep. 28, 2021 (JP) .................................. 2021-158039

(51) Int. Cl.
  *B60W 30/182* (2020.01)
  *B60W 60/00* (2020.01)
(52) U.S. Cl.
  CPC ...... *B60W 60/0059* (2020.02); *B60W 30/182* (2013.01); *B60W 60/0051* (2020.02); *B60W 60/0053* (2020.02)

(58) Field of Classification Search
  CPC ......... B60W 60/0059; B60W 60/0053; B60W 60/0051; B60W 30/182
  See application file for complete search history.

(56) References Cited

U.S. PATENT DOCUMENTS

| | | |
|---|---|---|
| 2021/0237765 A1 | 8/2021 | Ando |
| 2021/0237766 A1 | 8/2021 | Suzuki et al. |
| 2021/0286356 A1 | 9/2021 | Yang et al. |

FOREIGN PATENT DOCUMENTS

| | | |
|---|---|---|
| JP | 2018132015 A | 8/2018 |
| JP | 2021123135 A | 8/2021 |
| JP | 2021123138 A | 8/2021 |
| KR | 1020210115128 A | 9/2021 |

*Primary Examiner* — Mathew Franklin Gordon
(74) *Attorney, Agent, or Firm* — Dickinson Wright, PLLC

(57) ABSTRACT

A VCIB interfaces between an autonomous driving kit (ADK) and a vehicle platform (VP). The VP includes as vehicle modes, a manual mode in which the VP is under the control by a driver and an autonomous mode in which the VP is under the control by the ADK. When a first condition is satisfied in the manual mode, the VCIB has the vehicle mode make transition from the manual mode to the autonomous mode. The first condition includes (1) a condition that the VCIB has authenticated the ADK, (2) a condition that a power mode status signal indicates "drive mode," (3) a condition that a readiness-for-autonomization signal indicates "Ready for Autonomous Mode," and (4) a condition that a vehicle mode request indicates "Request for Autonomy."

12 Claims, 14 Drawing Sheets

FIG.5
<Power Mode Request>

| Value | Description | Remarks |
|---|---|---|
| 0 | No request | |
| 1 | Sleep | Turns OFF the vehicle |
| 2 | Wake | Turns ON VCIB |
| 3 | Reserved | |
| 4 | Reserved | |
| 5 | Reserved | |
| 6 | Drive | Turns ON the vehicle |

FIG.6
<Power Mode Status>

| Value | Description | Remarks |
|---|---|---|
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

FIG.7

<Vehicle Mode Request>

| Value | Description | Remarks |
|---|---|---|
| 0 | No Request | |
| 1 | Request for Autonomy | |
| 2 | Deactivation Request | means transition request to manual mode |

FIG.8

<Vehicle Mode State>

| Value | Description | Remarks |
|---|---|---|
| 0 | Manual Mode | The mode starts from Manual mode. |
| 1 | Autonomous Mode | |

FIG.9

<Readiness-for-Autonomization Signal>

| Value | Description | Remarks |
|---|---|---|
| 0 | Not Ready for Autonomous Mode | |
| 1 | Ready for Autonomous Mode | |
| 2 | Invalid | The status is not determined yet. |

FIG.13

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE PLATFORM, AUTONOMOUS DRIVING SYSTEM, AND VEHICLE CONTROL INTERFACE BOX

This nonprovisional application is based on Japanese Patent Application No. 2021-158039 filed with the Japan Patent Office on Sep. 28, 2021, the entire contents of which are hereby incorporated by reference.

BACKGROUND

Field

The present disclosure relates to a vehicle platform configured such that an autonomous driving system is mountable thereon, an autonomous driving system configured as being mountable on a vehicle platform, and a vehicle control interface box that interfaces between a vehicle platform and an autonomous driving system mounted on the vehicle platform.

Description of the Background Art

A technique for autonomous driving of a vehicle has recently been developed. For example, Japanese Patent Laying-Open No. 2018-132015 discloses an autonomous driving system that controls autonomous driving of a vehicle in a centralized manner. This autonomous driving system includes a camera, a laser apparatus, a radar apparatus, an operation apparatus, a gradient sensor, an autonomous driving device, and an autonomous driving electronic control unit (ECU).

SUMMARY

The autonomous driving system may externally be attached to a vehicle main body. In this case, autonomous driving is realized by control of a vehicle by a vehicle platform (which will be described later) in accordance with a command from the autonomous driving system. In this case, for example, the vehicle platform may include a manual mode in which it is under the control by a driver and an autonomous mode in which it is under the control by the autonomous driving system. There is a demand for appropriate switching between the manual mode and the autonomous mode.

The present disclosure was made to solve the above problem, and an object of the present disclosure is to appropriately switch between a manual mode and an autonomous mode in a vehicle platform on which an autonomous driving system is mountable.

(1) A vehicle platform according to one aspect of the present disclosure is a vehicle platform on which an autonomous driving system is mountable. The vehicle platform includes a vehicle and a vehicle control interface box that interfaces between the vehicle and the autonomous driving system. The vehicle platform includes as a vehicle mode, a manual mode in which the vehicle platform is under the control by a driver and an autonomous mode in which the vehicle platform is under the control by the autonomous driving system. The vehicle platform includes as a power mode, a sleep mode in which vehicle power is in an off condition, a wake mode in which the vehicle control interface box is awake, and a drive mode in which the vehicle power is in an on condition. The vehicle control interface box is configured to receive, from the autonomous driving system, a vehicle mode request that requests control of the vehicle mode and to provide the autonomous driving system with a readiness-for-autonomization signal indicating whether the vehicle platform is ready for the autonomous mode. When the vehicle control interface box receives the vehicle mode request that requests the autonomous mode, the power mode is set to the drive mode, and the readiness-for-autonomization signal indicates readiness for the autonomous mode after the vehicle control interface box authenticates the autonomous driving system, the vehicle control interface box has the vehicle mode make transition from the manual mode to the autonomous mode.

According to the configuration, when the power mode of the vehicle platform is set to the drive mode and the readiness-for-autonomization signal indicates readiness for the autonomous mode, that is, when the vehicle platform can provide for the autonomous mode, the vehicle mode transfers from the manual mode to the autonomous mode in accordance with the vehicle mode request that requests the autonomous mode. Therefore, transfer of the vehicle mode from the manual mode to the autonomous mode can appropriately be made.

(2) In one embodiment, the vehicle control interface box sets the vehicle mode to the manual mode, in transition of the power mode from the sleep mode to the wake mode or the drive mode.

According to the configuration, an initial state of the vehicle mode can be set to the manual mode.

(3) In one embodiment, when the vehicle control interface box receives the vehicle mode request that requests deactivation of the autonomous mode from the autonomous driving system while the vehicle mode has been set to the autonomous mode, the vehicle control interface box has the vehicle mode make transition from the autonomous mode to the manual mode.

According to the configuration, a condition for transfer of the vehicle mode from the autonomous mode to the manual mode can be simplified. Therefore, difficulty in mount of the autonomous driving system on the vehicle platform can be lowered.

(4) An autonomous driving system according to another aspect of the present disclosure is an autonomous driving system configured as being mountable on a vehicle platform. The vehicle platform includes a vehicle and a vehicle control interface box that interfaces between the vehicle and the autonomous driving system. The vehicle platform includes as a vehicle mode, a manual mode in which the vehicle platform is under the control by a driver and an autonomous mode in which the vehicle platform is under the control by the autonomous driving system. The vehicle platform includes as a power mode, a sleep mode in which vehicle power is in an off condition, a wake mode in which the vehicle control interface box is awake, and a drive mode in which the vehicle power is in an on condition. The autonomous driving system includes a compute assembly and a communication module that communicates with the vehicle control interface box. The compute assembly is configured to transmit a vehicle mode request that requests control of the vehicle mode to the vehicle control interface box through the communication module. When the compute assembly has the vehicle mode make transition from the manual mode to the autonomous mode after the vehicle control interface box authenticates the autonomous driving system, the compute assembly transmits the vehicle mode request that requests the autonomous mode to the vehicle control interface box.

(5) In one embodiment, the compute assembly is further configured to transmit a power mode request that requests control of the power mode to the vehicle control interface box through the communication module. When the compute assembly has the vehicle mode make transition from the manual mode to the autonomous mode, the compute assembly transmits the power mode request that requests the drive mode to the vehicle control interface box in addition to the vehicle mode request that requests the autonomous mode.

(6) In one embodiment, when the compute assembly turns on the vehicle platform, the compute assembly transmits the power mode request that requests the wake mode to the vehicle control interface box.

(7) In one embodiment, when the compute assembly has the vehicle mode make transition from the autonomous mode to the manual mode, the compute assembly transmits the vehicle mode request that requests deactivation of the autonomous mode to the vehicle control interface box.

(8) In one embodiment, the compute assembly receives, from the vehicle control interface box through the communication module, a readiness-for-autonomization signal that indicates whether the vehicle platform is ready for the autonomous mode.

(9) A vehicle control interface box according to another aspect of the present disclosure is a vehicle control interface box that interfaces between a vehicle platform and an autonomous driving system mounted on the vehicle platform. The vehicle platform includes as a vehicle mode, a manual mode in which the vehicle platform is under the control by a driver and an autonomous mode in which the vehicle platform is under the control by the autonomous driving system. The vehicle platform includes as a power mode, a sleep mode in which vehicle power is in an off condition, a wake mode in which the vehicle control interface box is awake, and a drive mode in which the vehicle power is in an on condition. The vehicle control interface box includes a processor and a memory in which a program executable by the processor is stored. The processor is configured to receive a vehicle mode request that requests control of the vehicle mode from the autonomous driving system and to provide the autonomous driving system with a readiness-for-autonomization signal indicating whether the vehicle platform is ready for the autonomous mode.

(10) In one embodiment, the processor is further configured to receive a power mode request that requests control of the power mode from the autonomous driving system. In transition of the vehicle mode from the manual mode to the autonomous mode, the processor authenticates the autonomous driving system, receives, from the autonomous driving system, the vehicle mode request that requests the autonomous mode and the power mode request that requests the drive mode, and provides the autonomous driving system with the readiness-for-autonomization signal indicating readiness for the autonomous mode.

(11) In one embodiment, the processor is further configured to provide the autonomous driving system with a power mode status signal that indicates a status of the power mode of the vehicle platform. In transition of the vehicle mode from the manual mode to the autonomous mode, the processor authenticates the autonomous driving system, receives the vehicle mode request that requests the autonomous mode from the autonomous driving system, and provides the autonomous driving system with the readiness-for-autonomization signal that indicates readiness for the autonomous mode and the power mode status signal that indicates the drive mode.

(12) In one embodiment, in transition of the vehicle mode from the autonomous mode to the manual mode, the processor receives the vehicle mode request that requests deactivation of the autonomous mode from the autonomous driving system.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a diagram for illustrating a power mode request.

FIG. 6 is a diagram for illustrating a power mode status signal.

FIG. 7 is a diagram for illustrating a vehicle mode request.

FIG. 8 is a diagram for illustrating a vehicle mode state signal.

FIG. 9 is a diagram for illustrating a readiness-for-autonomization signal.

FIG. 13 is a diagram showing a typical workflow in the ADS.

DESCRIPTION OF THE PREFERRED EMBODIMENTS

Figure 1:
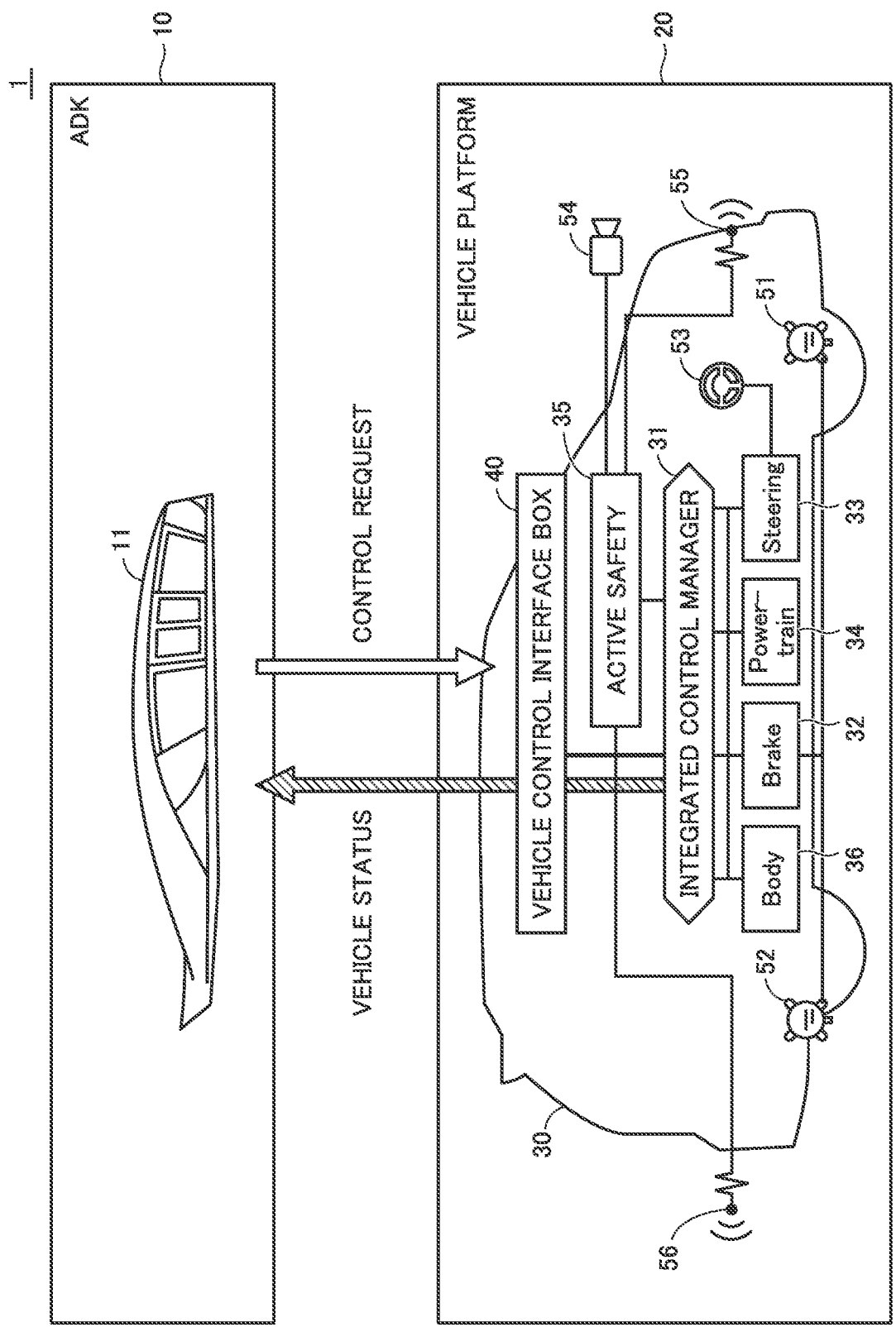
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

Embodiment

FIG. 1 is a diagram showing overview of a vehicle according to an embodiment of the present disclosure. A vehicle 1 includes an autonomous driving kit (ADK) 10 and a vehicle platform (VP) 20. ADK 100 is configured as being attachable to VP 20 (mountable on vehicle 1). ADK 100 and VP 20 are configured to communicate with each other through a vehicle control interface (a VCIB 40 which will be described later).

VP 20 can carry out autonomous driving in accordance with control requests from ADK 10. Though FIG. 1 shows ADK 10 at a position distant from VP 20, ADK 10 is actually attached to a rooftop or the like of VP 20. ADK 10 can also be removed from VP 20. While ADK 10 is not attached, VP 20 carries out travel control (travel control in accordance with an operation by a user) in a manual mode.

ADK 10 includes an autonomous driving system (ADS) 11 for autonomous driving of vehicle 1. For example, ADS 11 creates a driving plan of vehicle 1. ADS 11 outputs various control requests for travel of vehicle 1 in accordance with the driving plan to VP 20 in accordance with an application program interface (API) defined for each control request. ADS 11 receives various signals indicating vehicle statuses (statuses of VP 20) from VP 20 in accordance with the API defined for each signal. Then, ADS 11 has the vehicle status reflected on the driving plan. A detailed configuration of ADS 11 will be described with reference to FIG. 2.

VP 20 includes a base vehicle 30 and a vehicle control interface box (VCIB) 40.

Base vehicle 30 carries out various types of vehicle control in accordance with a control request from ADK 10 (ADS 11). Base vehicle 30 includes various systems and various sensors for controlling base vehicle 30. More specifically, base vehicle 30 includes an integrated control manager 31, a brake system 32, a steering system 33, a powertrain system 34, an active safety system 35, a body system 36, wheel speed sensors 51 and 52, a pinion angle sensor 53, a camera 54, and radar sensors 55 and 56.

Integrated control manager 31 includes a processor and a memory, and integrally controls the systems (brake system 32, steering system 33, powertrain system 34, active safety system 35, and body system 36) involved with operations of vehicle 1.

Brake system 32 is configured to control a braking apparatus provided in each wheel of base vehicle 30. The braking apparatus includes, for example, a disc brake system (not shown) that is operated with a hydraulic pressure regulated by an actuator.

Wheel speed sensors 51 and 52 are connected to brake system 32. Wheel speed sensor 51 detects a rotation speed of a front wheel of base vehicle 30 and outputs the detected rotation speed of the front wheel to brake system 32. Wheel speed sensor 52 detects a rotation speed of a rear wheel of base vehicle 30 and outputs the detected rotation speed of the rear wheel to brake system 32. Brake system 32 outputs to VCIB 40, the rotation speed of each wheel as one of pieces of information included in the vehicle statuses. Brake system 32 generates a braking command to a braking apparatus in accordance with a prescribed control request outputted from ADS 11 through VCIB 40 and integrated control manager 31. Brake system 32 controls the braking apparatus based on the generated braking command. Integrated control manager 31 can calculate a speed of vehicle 1 (vehicle speed) based on the rotation speed of each wheel.

Steering system 33 is configured to control a steering angle of a steering wheel of vehicle 1 with a steering apparatus. The steering apparatus includes, for example, rack-and-pinion electric power steering (EPS) that allows adjustment of a steering angle by an actuator.

Pinion angle sensor 53 is connected to steering system 33. Pinion angle sensor 53 detects an angle of rotation of a pinion gear (a pinion angle) coupled to a rotation shaft of the actuator and outputs the detected pinion angle to steering system 33. Steering system 33 outputs to VCIB 40, the pinion angle as one of pieces of information included in the vehicle statuses. Steering system 33 generates a steering command to the steering apparatus in accordance with a prescribed control request outputted from ADS 11 through VCIB 40 and integrated control manager 31. Steering system 33 controls the steering apparatus based on the generated steering command.

Powertrain system 34 controls an electric parking brake (EPB) system 341 provided in at least one of a plurality of wheels, a parking lock (P-Lock) system 342 provided in a transmission of vehicle 1, and a propulsion system 343 including a shift apparatus (not shown) configured to allow selection of a shift range. A further detailed configuration of powertrain system 34 will be described with reference to FIG. 2.

Active safety system 35 detects an obstacle (a pedestrian, a bicycle, a parked vehicle, a utility pole, or the like) in front or in the rear with the use of camera 54 and radar sensors 55 and 56. Active safety system 35 determines whether or not vehicle 1 may collide with the obstacle based on a distance between vehicle 1 and the obstacle and a direction of movement of vehicle 1. When active safety system 35 determines that there is possibility of collision, it outputs a braking command to brake system 32 through integrated control manager 31 so as to increase braking force.

Body system 36 is configured to control, for example, components such as a direction indicator, a horn, and a wiper (none of which is shown), depending on a state of travel or an environment around vehicle 1. Body system 36 controls each component in accordance with a prescribed control request outputted from ADS 11 through VCIB 40 and integrated control manager 31.

VCIB 40 is configured to communicate with ADS 11 over a controller area network (CAN). VCIB 40 receives various control requests from ADS 11 or outputs a vehicle status to ADS 11 by executing a prescribed API defined for each signal. When VCIB 40 receives the control request from ADK 10, it outputs a control command corresponding to the control request to a system corresponding to the control command through integrated control manager 31. VCIB 40 obtains various types of information on base vehicle 30 from various systems through integrated control manager 31 and outputs the status of base vehicle 30 as the vehicle status to ADS 11.

Vehicle 1 may be used as one of constituent elements of a mobility as a service (MaaS) system. The MaaS system includes, for example, a data server and a mobility service platform (MSPF) (neither of which is shown), in addition to vehicle 1.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF.

Vehicle 1 further includes a data communication module (DCM) (not shown) capable of wirelessly communicating with a data server. The DCM outputs vehicle information such as a speed, a position, or an autonomous driving state to the data server. The DCM receives from the autonomous driving related mobility services through the MSPF and the data server, various types of data for management of travel of an autonomous driving vehicle including vehicle 1 in the mobility services.

The MSPF publishes APIs for using various types of data on vehicle statuses and vehicle control necessary for development of ADS 11. Various mobility services can use various functions provided by the MSPF depending on service contents, by using the APIs published on the MSPF. For example, the autonomous driving related mobility services can obtain operation control data of vehicle 1 or information stored in the data server from the MSPF by using the APIs published on the MSPF. The autonomous driving related mobility services can transmit data for managing an autonomous driving vehicle including vehicle 1 to the MSPF by using the API.

<Detailed Configuration>

Figure 2:
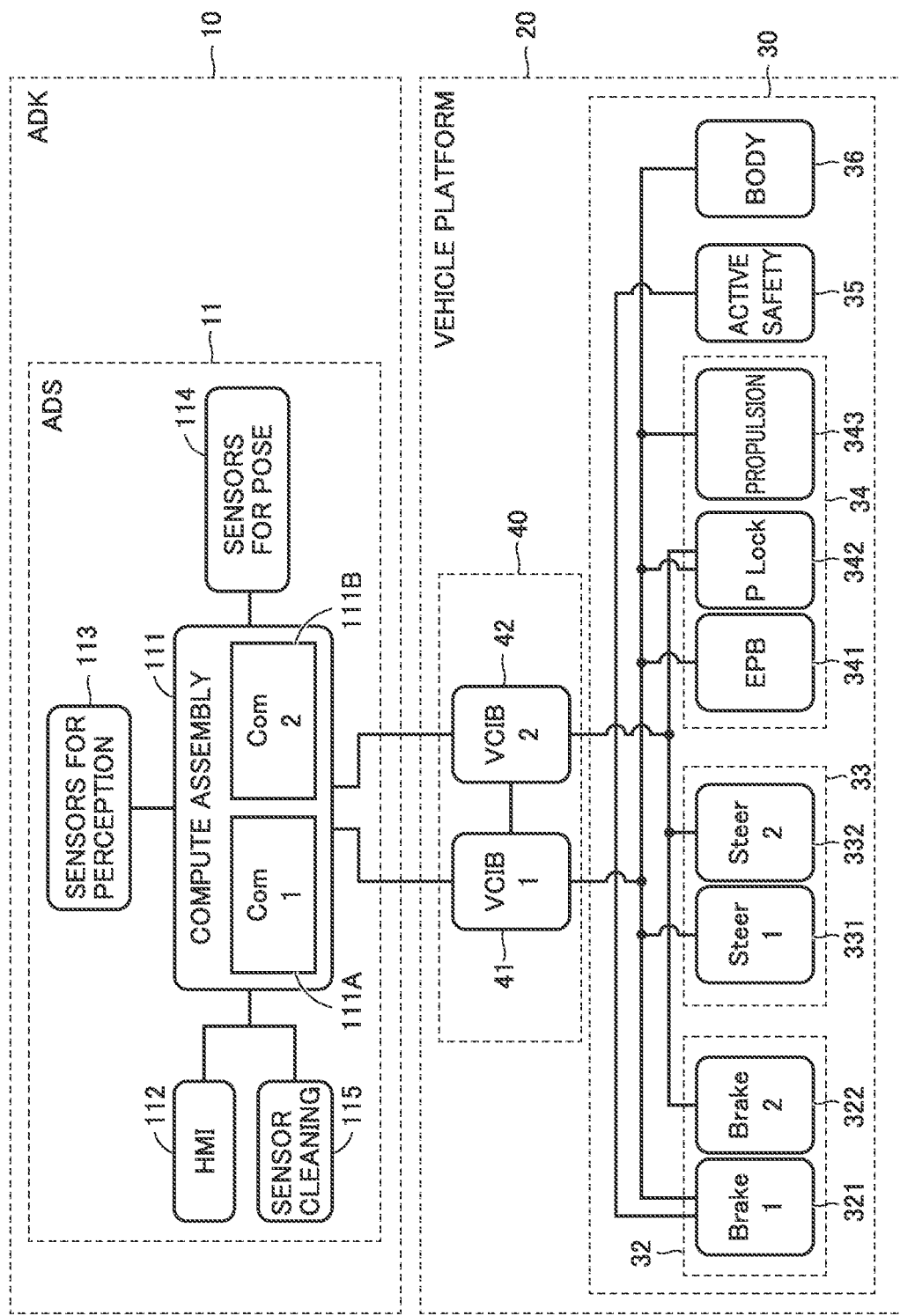
FIG. 2 is a diagram showing in further detail, a configuration of an ADS, a VCIB, and a VP.

FIG. 2 is a diagram showing in further detail, a configuration of ADS 11, VCIB 40, and VP 20. As shown in FIG. 2, ADS 11 includes a compute assembly 111, a human machine interface (HMI) 112, sensors for perception 113, sensors for pose 114, and a sensor cleaning 115.

During autonomous driving of vehicle 1, compute assembly 111 obtains information indicating an environment around vehicle 1 and information indicating a pose, a behavior, and a position of vehicle 1 from various sensors (which will be described later), and obtains a vehicle status from VP 20 through VCIB 40 and sets a next operation (acceleration, deceleration, or turning) of vehicle 1. Compute assembly 111 outputs various commands for realizing a next operation to VCIB 40. Compute assembly 111 includes communication modules 111A and 111B. Communication modules 111A and 111B are each configured to communicate with VCIB 40.

HMI 112 presents information to a user and accepts an operation by the user during autonomous driving, during driving requiring an operation by the user, or at the time of transition between autonomous driving and driving requiring an operation by the user. HMI 112 is constructed to be connected to an input and output apparatus (not shown) such as a touch panel display provided in base vehicle 30.

Sensors for perception 113 are sensors that perceive an environment around vehicle 1. Sensors for perception 113 include, for example, at least one of laser imaging detection and ranging (LIDAR), a millimeter-wave radar, and a camera (none of which is shown). The LIDAR measures a distance and a direction to an object, for example, by emitting laser beams of infrared pulses and detecting laser beams reflected by the object. The millimeter-wave radar measures a distance and a direction to an object by emitting millimeter waves and detecting millimeter waves reflected by the object. The camera is arranged, for example, on a rear side of a room mirror and shoots an image of the front of vehicle 1.

Sensors for pose 114 are sensors that detect a pose, a behavior, or a position of vehicle 1. Sensors for pose 114 include, for example, an inertial measurement unit (IMU) and a global positioning system (GPS) (neither of which is shown). The IMU detects, for example, an acceleration in a front-rear direction, a lateral direction, and a vertical direction of vehicle 1 and an angular speed in a roll direction, a pitch direction, and a yaw direction of vehicle 1. The GPS detects a position of vehicle 1 based on information received from a plurality of GPS satellites that orbit the Earth.

Sensor cleaning 115 is configured to remove with a cleaning solution or a wiper, soiling attached to various sensors (a lens of the camera or a portion from which laser beams are emitted) during traveling of vehicle 1.

VCIB 40 includes a VCIB 41 and a VCIB 42. Each of VCIBs 41 and 42 includes a processor such as a central processing unit (CPU) and a memory such as a read only memory (ROM) and a random access memory (RAM), although none of them is shown. A program executable by the processor is stored in the memory. VCIB 41 and communication module 111A are communicatively connected to each other. VCIB 42 and communication module 111B are communicatively connected to each other. VCIB 41 and VCIB 42 are communicatively connected to each other.

VCIBs 41 and 42 each relay control requests and vehicle information between ADS 11 and VP 20. More specifically, VCIB 41 generates a control command from a control request from ADS 11 with the use of an API. For example, a control command includes a propulsion direction command requesting switching of the shift range, an immobilization command requesting activation/deactivation of EPB system 341 and P-Lock system 342, an acceleration command requesting acceleration or deceleration of vehicle 1, a wheel steer angle command requesting a wheel steer angle of a steering wheel, and an autonomization command requesting switching between an autonomous mode and a manual mode. Then, VCIB 41 outputs the generated control command to a corresponding system of a plurality of systems included in VP 20. VCIB 41 generates information indicating a vehicle status from the vehicle information from each system of VP 20 with the use of the API. The information indicating the vehicle status may be information identical to the vehicle information or may be information extracted from the vehicle information to be used for processing performed by ADS 11. VCIB 41 provides the generated information indicating the vehicle status to ADS 11. This is also applicable to VCIB 42.

Brake system 32 includes brake systems 321 and 322. Steering system 33 includes steering systems 331 and 332. Powertrain system 34 includes EPB system 341, P-Lock system 342, and propulsion system 343.

Though VCIB 41 and VCIB 42 are basically equivalent in function to each other, they are partially different in systems connected to the VCIBs that are included in VP 20. Specifically, VCIB 41, brake system 321, steering system 331, EPB system 341, P-Lock system 342, propulsion system 343, and body system 36 are communicatively connected to one another through a communication bus. VCIB 42, brake system 322, steering system 332, and P-Lock system 342 are communicatively connected to one another through a communication bus.

As VCIBs 41 and 42 equivalent in function relating to an operation of at least one of (for example, braking or steering) systems are thus included in VCIB 40, control systems between ADS 11 and VP 20 are redundant. Thus, when some kind of failure occurs in the system, the function of VP 20 can be maintained by switching between the control systems as appropriate or disconnection of a control system where failure has occurred.

Brake systems 321 and 322 are each configured to control a braking apparatus. Brake system 321 generates a braking command to the braking apparatus in accordance with a control request outputted from ADS 11 through VCIB 41. Brake system 322 generates a braking command to the braking apparatus in accordance with a control request outputted from ADS 11 through VCIB 42. Brake system 321 and brake system 322 may be equivalent in function to each other. Alternatively, one of brake systems 321 and 322 may be configured to independently control braking force of each wheel and the other thereof may be configured to control braking force such that equal braking force is generated in the wheels. For example, brake systems 321 and 322 may control the braking apparatus based on a braking command generated by any one of them, and when a failure occurs in that brake system, they may control the braking apparatus based on a braking command generated by the other of them.

Steering systems 331 and 332 are each configured to control a steering angle of a steering wheel of vehicle 1 with a steering apparatus. Steering system 331 generates a steering command to the steering apparatus in accordance with a control request outputted from ADS 11 through VCIB 41. Steering system 332 generates a steering command to the steering apparatus in accordance with a control request outputted from ADS 11 through VCIB 42. Steering system 331 and steering system 332 may be equivalent in function to each other. Alternatively, steering systems 331 and 332 may control the steering apparatus based on the steering command generated by any one of them, and when a failure occurs in that steering system, they may control the steering apparatus based on a steering command generated by the other of them.

EPB system 341 controls the EPB in accordance with a control request outputted from ADS 11 through VCIB 41. The EPB is provided separately from the braking apparatus (a disc brake system or the like), and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 321 and 322. EPB system 341 performs a brakeholding function, and may be configured to switch between activation and release of brakehold.

P-Lock system 342 controls a P-Lock apparatus in accordance with a control request outputted from ADS 11 through VCIB 41. For example, when the control request includes a control request to set the shift range to a parking range (P range), P-Lock system 342 activates the P-Lock apparatus, and when the control request includes a control request to set the shift range to a shift range other than the P range, it deactivates the P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 1. Rotation of an output shaft of the transmission is thus fixed and the wheel is fixed.

Propulsion system 343 switches the shift range of the shift apparatus and controls driving force from a drive source (a motor generator and an engine) in accordance with a control request outputted from ADS 11 through VCIB 41. The shift ranges include, for example, a neutral range (N range), a forward travel range (D range), and a rearward travel range (R range) in addition to the P range.

Active safety system 35 is communicatively connected to brake system 321. As described previously, active safety system 35 detects an obstacle in front by using camera 54 and/or radar sensor 55, and when it determines that there is possibility of collision, it outputs a braking command to brake system 321 so as to increase braking force.

Body system 36 controls components such as a direction indicator, a horn, or a wiper in accordance with a control request outputted from ADS 11 through VCIB 41.

For example, when an autonomous mode which will be described later is selected by a request from ADK 10 in vehicle 1, autonomous driving is carried out. During autonomous driving, ADS 11 initially creates a driving plan as described previously. Examples of the driving plan include a plan to continue straight travel, a plan to turn left/right at a prescribed intersection on a predetermined travel path, and a plan to change a travel lane. ADS 11 calculates a controllable physical quantity (an acceleration, a deceleration, and a wheel steer angle) necessary for operations of vehicle 1 in accordance with the created driving plan. ADS 11 splits the physical quantity for each execution cycle time of the API. ADS 11 outputs a control request representing the split physical quantity to VCIB 40 by means of the API. Furthermore, ADS 11 obtains a vehicle status (an actual direction of movement of vehicle 1 and a state of fixation of the vehicle) from VP 20 and creates again the driving plan on which the obtained vehicle status is reflected. ADS 11 thus allows autonomous driving of vehicle 1.

<Mode Transition>

Figure 3:
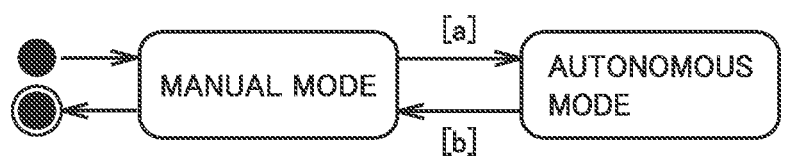
FIG. 3 shows a state machine that shows transition of a vehicle mode.

FIG. 3 shows a state machine that shows transition of a vehicle mode. In this example, vehicle 1 includes a manual mode and an autonomous mode as the vehicle modes.

The manual mode refers to a mode as in a vehicle that does not provide for autonomous driving, that is, a mode in which VP 20 is under the control by a driver. In the manual mode, ADK 10 is basically unable to control VP 20 except for addressing some requests.

The autonomous mode refers to a mode in which VP 20 is under the control by ADK 10 and vehicle 1 can autonomously travel. In the autonomous mode, after VCIB 40 successfully authenticates ADK 10, ADK 10 is able to communicate with VP 20. In the autonomous mode, VP 20 is under the control by ADK 10 as a result of issuance of "Request for Autonomy" as a vehicle mode request (which will be described later) from ADK 10.

In the manual mode, a power mode status is set to a "wake mode (Wake)" or a "drive mode (Drive)". A vehicle mode state is set to the "manual mode."

In the autonomous mode, the power mode status is set to the "drive mode." The vehicle mode state is set to the "autonomous mode."

Figure 4:
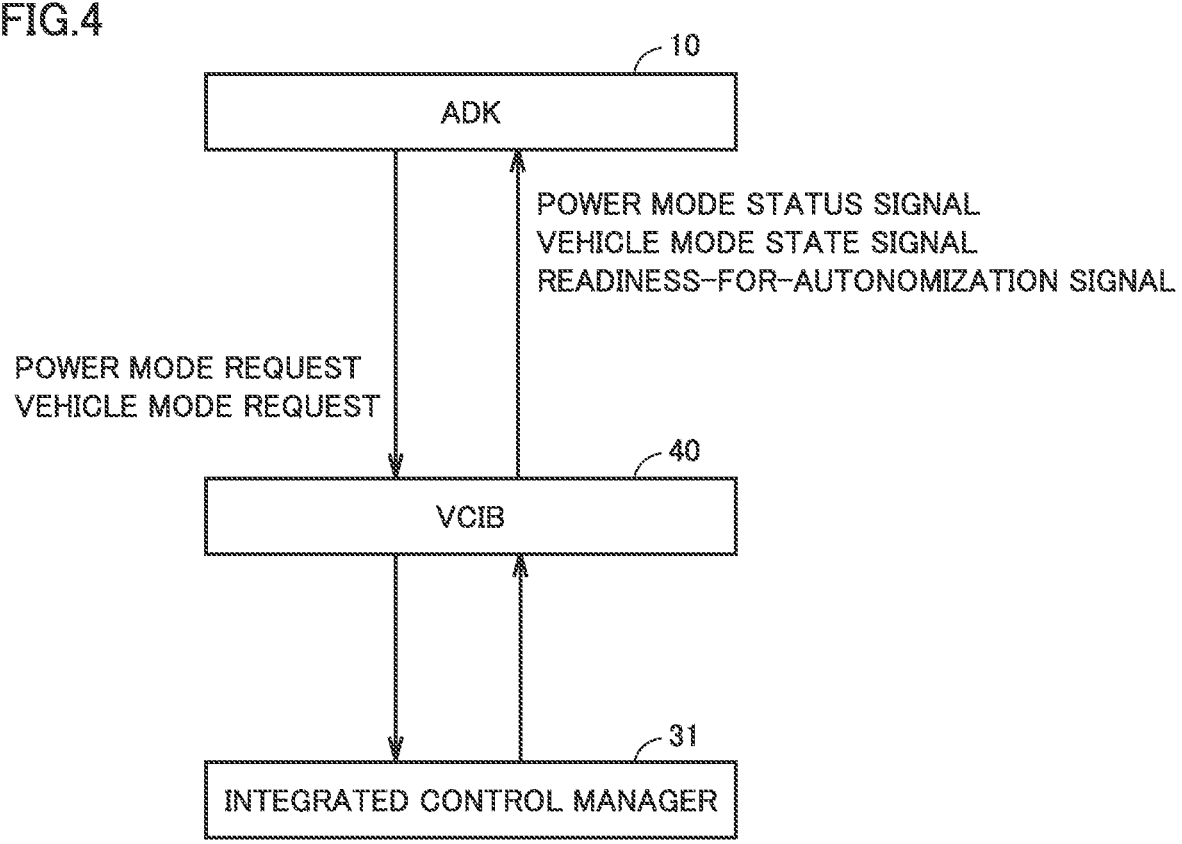
FIG. 4 is a diagram showing a direction of transmission of various signals or commands relating to transition between modes.

FIG. 4 is a diagram showing a direction of transmission of various signals or commands (requests) relating to transition between modes. In mode transition, VCIB 40 receives a power mode request (power mode command) and a vehicle mode request (vehicle mode command) from ADK 10 (ADS 11). VCIB 40 provides a power mode status signal, a vehicle mode state signal, and a readiness-for-autonomization signal (Readiness for autonomization) to ADK 10.

The power mode request is a request for controlling the power mode of VP 20. The power mode status signal is a signal indicating a current status of the power mode of VP 20.

FIG. 5 is a diagram for illustrating a power mode request. Referring to FIG. 5, in this vehicle 1, ADS 11 transmits the power mode request to VCIB 40 in accordance with a prescribed API so as to be able to control the power mode of VP 20.

VP 20 according to the present embodiment includes three power modes of a sleep mode (Sleep), the wake mode (Wake), and the drive mode (Drive) as the power modes.

The sleep mode (Sleep) refers to a state in which a power supply of VP 20 is off (vehicle power is in an off condition). In the sleep mode, power is not fed from a vehicle-mounted main battery (not shown) to each system, and VCIB 40 (VCIBs 41 and 42) and each system (ECU) of base vehicle 30 have not been turned on.

The wake mode (Wake) refers to a state that VCIB 40 is awake by power feed from a vehicle-mounted auxiliary battery (not shown). In the wake mode, power is not fed from the main battery, and ECUs other than VCIB 40 are not awake except for some body electrical ECUs (for example, a verification ECU for verifying a smart key or a body ECU that controls locking/unlocking of a door) in body system 36.

The drive mode (Drive) refers to a state in which the power supply of VP 20 is on (the vehicle power is in an on condition). In the drive mode, power is fed from the main battery so that VCIB 40 and each system of base vehicle 30 are turned on and VP 20 is able to travel.

The power mode request can take any of values 0 to 6 as an argument. The value 0 is set when no request for the power mode of VP 20 is issued from ADS 11. When VCIB 40 receives the power mode request in which the value 0 has been set, VP 20 maintains the power mode at that time.

A value 1 is set when a request for the sleep mode (Sleep) is issued from ADS 11. In other words, the power mode request in which the value 1 has been set requests turn-off of VP 20. When VCIB 40 receives the power mode request in which the value 1 has been set, the power mode of VP 20 makes transition to the sleep mode and VP 20 is set to a power off state.

A value 2 is set when the wake mode (Wake) is requested from ADS 11. In other words, the power mode request in which the value 2 has been set requests turn-on of VCIB 40. When VCIB 40 receives the power mode request in which the value 2 has been set, the power mode of VP 20 makes transition to the wake mode and VCIB 40 is turned on by receiving power feed from the auxiliary battery.

Values 3 to 5 are reserved for future expansion. The values 3 to 5 are not used in the present embodiment.

The value 6 is set when the drive mode (Drive) is requested from ADS 11. In other words, the power mode request in which the value 6 has been set requests turn-on of VP 20. When VCIB 40 receives the power mode request in which the value 6 has been set, the power mode of VP 20 makes transition to the drive mode and VP 20 is set to a power on state.

FIG. 6 is a diagram for illustrating a power mode status signal. Referring to FIG. 6, in this vehicle 1, ADS 11 is notified of a status of the power mode of VP 20 by transmission of a signal indicating a status of the power mode from VCIB 40 to ADS 11 in accordance with a prescribed API.

A power mode status signal transmitted to ADS 11 can take any of values 0 to 7 as an argument. The values 0 and 3 to 5 are not used at the current time point and reserved.

The value 1 is set when the power mode is set to the sleep mode (Sleep). The value 2 is set when the power mode is set to the wake mode (Wake). The value 6 is set when the power mode is set to the drive mode (Drive). The value 7 is set when some unhealthy situation would occur in the power supply of VP 20.

FIG. 7 is a diagram for illustrating a vehicle mode request. Referring to FIG. 7, in this vehicle 1, ADS 11 transmits the vehicle mode request to VCIB 40 in accordance with a prescribed API to be able to control the vehicle mode of VP 20.

As described above, VP 20 according to the present embodiment includes two vehicle modes of the manual mode and the autonomous mode as the vehicle modes.

The vehicle mode request can take any of values 0 to 2 as an argument. The value 0 is set when no request for the vehicle mode of VP 20 is issued from ADS 11. When VCIB 40 receives the vehicle mode request in which the value 0 has been set, the vehicle mode at that time is maintained.

The value 1 is set when ADS 11 requests the autonomous mode (Request for Autonomy). In other words, the vehicle mode request (Request for Autonomy) in which the value 1 has been set requests transfer of the vehicle mode from the manual mode to the autonomous mode.

The value 2 is set when ADS 11 requests the manual mode (Deactivation Request). In other words, the vehicle mode request (Deactivation Request) in which the value 2 has been set requests transfer of the vehicle mode from the autonomous mode to the manual mode.

FIG. 8 is a diagram for illustrating a vehicle mode state signal. In this vehicle 1, ADS 11 is notified of a state of the vehicle mode of VP 20 by transmission of a signal indicating a state of the vehicle mode from VCIB 40 to ADS 11 in accordance with a prescribed API.

The vehicle mode state signal can take any of values 0 and 1 as an argument. The value 0 is set when the vehicle mode is set to the manual mode. The value 1 is set when the vehicle mode is set to the autonomous mode. At the time when VP 20 is turned on (the power mode status being set to Wake or Drive), the vehicle mode starts from the manual mode. In other words, the initial state of the vehicle mode is set to the "manual mode."

FIG. 9 is a diagram for illustrating a readiness-for-autonomization signal. In this vehicle 1, ADS 11 is notified of whether or not transfer of VP 20 to the autonomous mode can be made by transmission of a signal indicating a status of readiness for autonomization of VP 20 from VCIB 40 to ADS 11 in accordance with a prescribed API.

The readiness-for-autonomization signal can take any of values 0 to 2 as an argument. The value 0 is set when VP 20 is not ready for the autonomous mode (Not Ready for Autonomous Mode). The value 1 is set when VP 20 is ready for the autonomous mode (Ready for Autonomous Mode). The value 2 is set when the status has not yet been determined. The value 2 means an invalid value (Invalid).

<<Transition a>>

Transition between modes will be described in detail with reference to FIG. 3 again. Transition a represents transition from the manual mode to the autonomous mode. When a first condition is satisfied in the manual mode, the vehicle mode makes transition from the manual mode to the autonomous mode. The first condition includes conditions (1) to (4) below. The first condition is satisfied when all of the conditions (1) to (4) below are satisfied. The first condition is not satisfied when at least one of the conditions (1) to (4) below is not satisfied:

(1) A condition that VCIB 40 has authenticated ADK 100;
(2) A condition that the power mode status signal indicates the "drive mode (Drive);"
(3) A condition that the readiness-for-autonomization signal indicates "Ready for Autonomous Mode;" and
(4) A condition that the vehicle mode request indicates "Request for Autonomy."

<<Transition b>>

Transition b represents transition from the autonomous mode to the manual mode. When a second condition that the vehicle mode request indicates "Deactivation Request" is satisfied in the autonomous mode, the vehicle mode makes transition from the autonomous mode to the manual mode.

Figure 10:
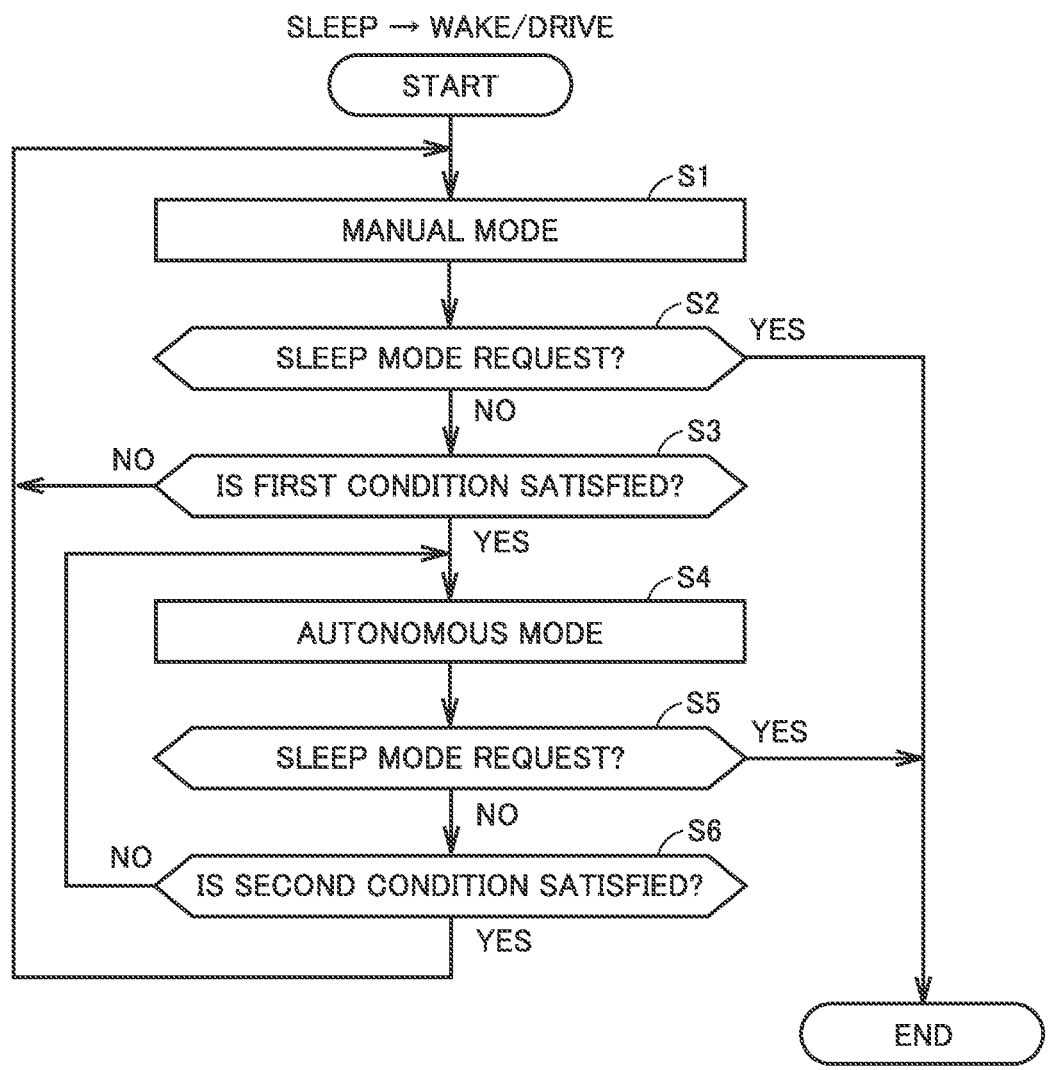
FIG. 10 is a flowchart showing a procedure of processing relating to transition of the vehicle mode.

FIG. 10 is a flowchart showing a procedure of processing relating to transition of the vehicle mode. The flowchart in FIG. 10 is started by VCIB 40 when the power mode is set to the wake mode or the drive mode from the sleep mode. In other words, the flowchart in FIG. 10 is started with turn-on of VCIB 40.

In S1, VCIB 40 sets the vehicle mode to the manual mode. In other words, the initial state of the vehicle mode is set to the "manual mode."

In S2, VCIB 40 determines whether or not transfer of the power mode to the sleep mode has been requested. When VCIB 40 determines that transfer of the power mode to the sleep mode has not been requested (NO in S2), the process proceeds to S3. When VCIB 40 determines that transfer of the power mode to the sleep mode has been requested (YES in S2), a series of processing ends.

In S3, VCIB 40 determines whether or not the first condition has been satisfied. Specifically, VCIB 40 determines whether or not the conditions (1) to (4) described above included in the first condition have been satisfied. When VCIB 40 determines that the first condition has not been satisfied (NO in S3), the process returns to S1 and the vehicle mode is maintained in the manual mode. When VCIB 40 determines that the first condition has been satisfied (YES in S3), the process proceeds to S4.

In S4, VCIB 40 has the vehicle mode make transition (transfer) from the manual mode to the autonomous mode.

In S5, VCIB 40 determines whether or not transfer of the power mode to the sleep mode has been requested. When VCIB 40 determines that transfer of the power mode to the sleep mode has not been requested (NO in S5), the process proceeds to S6. When VCIB 40 determines that transfer of the power mode to the sleep mode has been requested (YES in S5), the series of processing ends.

In S6, VCIB 40 determines whether or not the second condition has been satisfied. When VCIB 40 determines that the second condition has not been satisfied (NO in S6), the process returns to S4 and the vehicle mode is maintained in the autonomous mode. When VCIB 40 determines that the second condition has been satisfied (YES in S6), the process returns to S1 and the vehicle mode makes transition (transfer) from the autonomous mode to the manual mode.

As set forth above, in the present embodiment, when the power mode status signal indicates the "drive mode (Drive)," the readiness-for-autonomization signal indicates "Ready for Autonomous Mode," and the vehicle mode request indicates "Request for Autonomy" after VCIB 40 authenticates ADK 10, VCIB 40 has the vehicle mode make transition (transfer) from the manual mode to the autonomous mode. The above condition (first condition) having been satisfied can ensure that VP 20 can provide for the autonomous mode. Therefore, while VP 20 can provide for the autonomous mode, the vehicle mode is transferred from the manual mode to the autonomous mode. Therefore, transfer of the vehicle mode from the manual mode to the autonomous mode can appropriately be made.

Furthermore, when the vehicle mode request indicates "Deactivation Request," VCIB 40 has the vehicle mode make transition (transfer) from the autonomous mode to the manual mode. Simplification of the condition for transfer of the vehicle mode from the autonomous mode to the manual mode can lower difficulty in mount of ADS 11.

Example

API Specification for TOYOTA Vehicle Platform
Ver. 1.1
Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
    1.1. Purpose of this Specification
    1.2. Target Vehicle
    1.3. Definition of Term
2. Structure
    2.1. Overall Structure of Autono-MaaS Vehicle
    2.2. System Structure of Autono-MaaS Vehicle
3. Application Interfaces
    3.1. Typical Usage of APIs
    3.2. APIs for Vehicle Motion Control
        3.2.1. API List for Vehicle Motion Control
        3.2.2. Details of Each API for Vehicle Motion Control
    3.3. APIs for BODY Control
        3.3.1. API List for BODY Control
        3.3.2. Details of Each API for BODY Control
    3.4. APIs for Power Control
        3.4.1. API List for Power Control
        3.4.2. Details of Each API for Power Control
    3.5. APIs for Failure Notification
        3.5.1. API List for Failure Notification
        3.5.2. Details of Each API for Failure Notification
    3.6. APIs for Security
        3.6.1. API List for Security
        3.6.2. Details of Each API for Security
4. API Guides to Control Toyota Vehicles
    4.1. APIs for Vehicle Motion Control
        4.1.1. API List for Vehicle Motion Control
        4.1.2. API Guides in Details for Vehicle Motion Control
    4.2. APIs for BODY Control
        4.2.1. API List for Power Control
    4.3. APIs for Power Control
        4.3.1. API List for Power Control
    4.4. APIs for Failure Notification
        4.4.1. API List for Failure Notification
    4.5. APIs for Security
        4.5.1. API List for Security
        4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. Structure

2.1. Overall Structure of Autono-MaaS Vehicle

Figure 11:
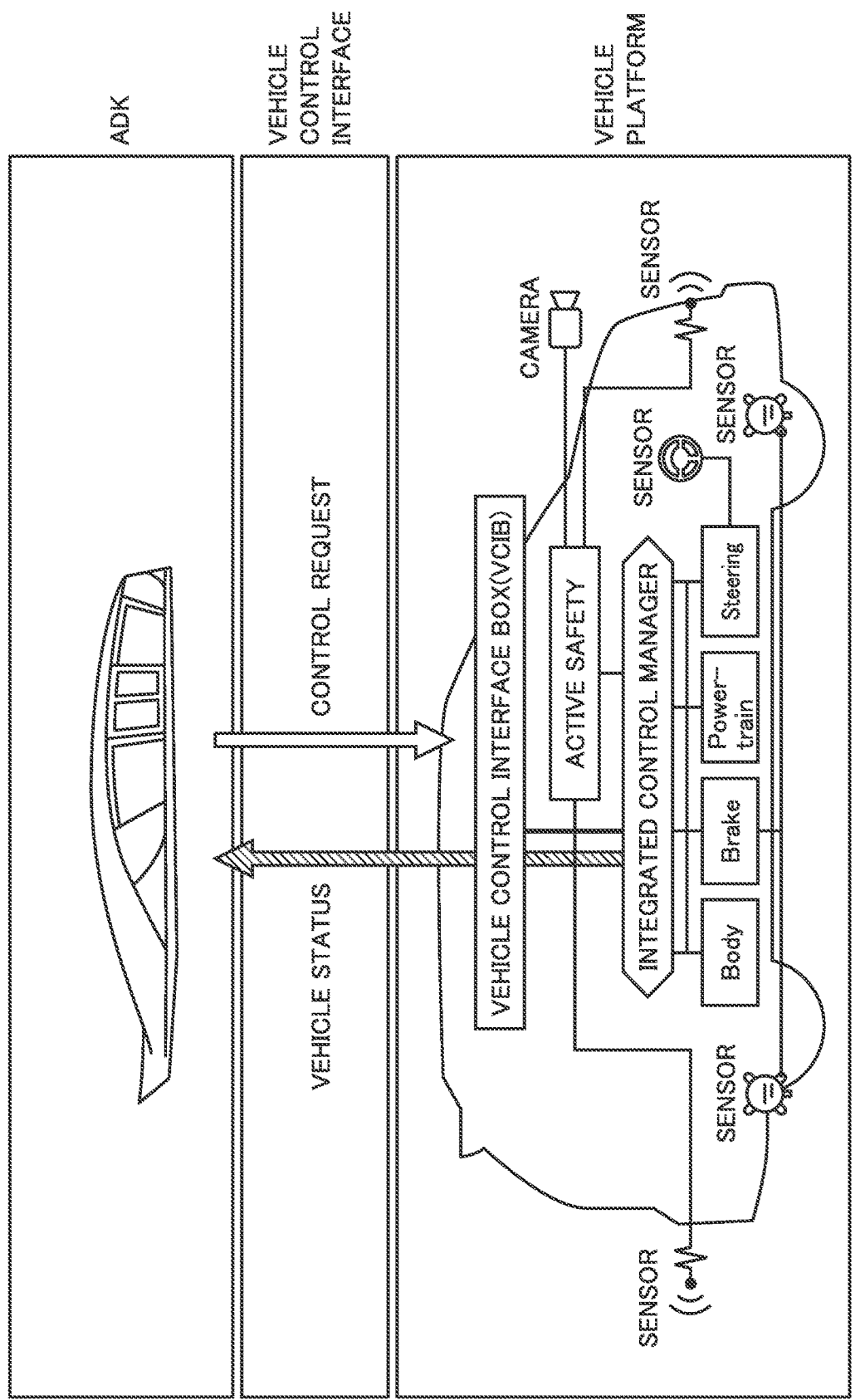
FIG. 11 is a diagram showing an overall structure of an Autono-MaaS vehicle.

The overall structure of Autono-MaaS is shown (FIG. 11).

2.2. System Structure of Autono-MaaS Vehicle

Figure 12:
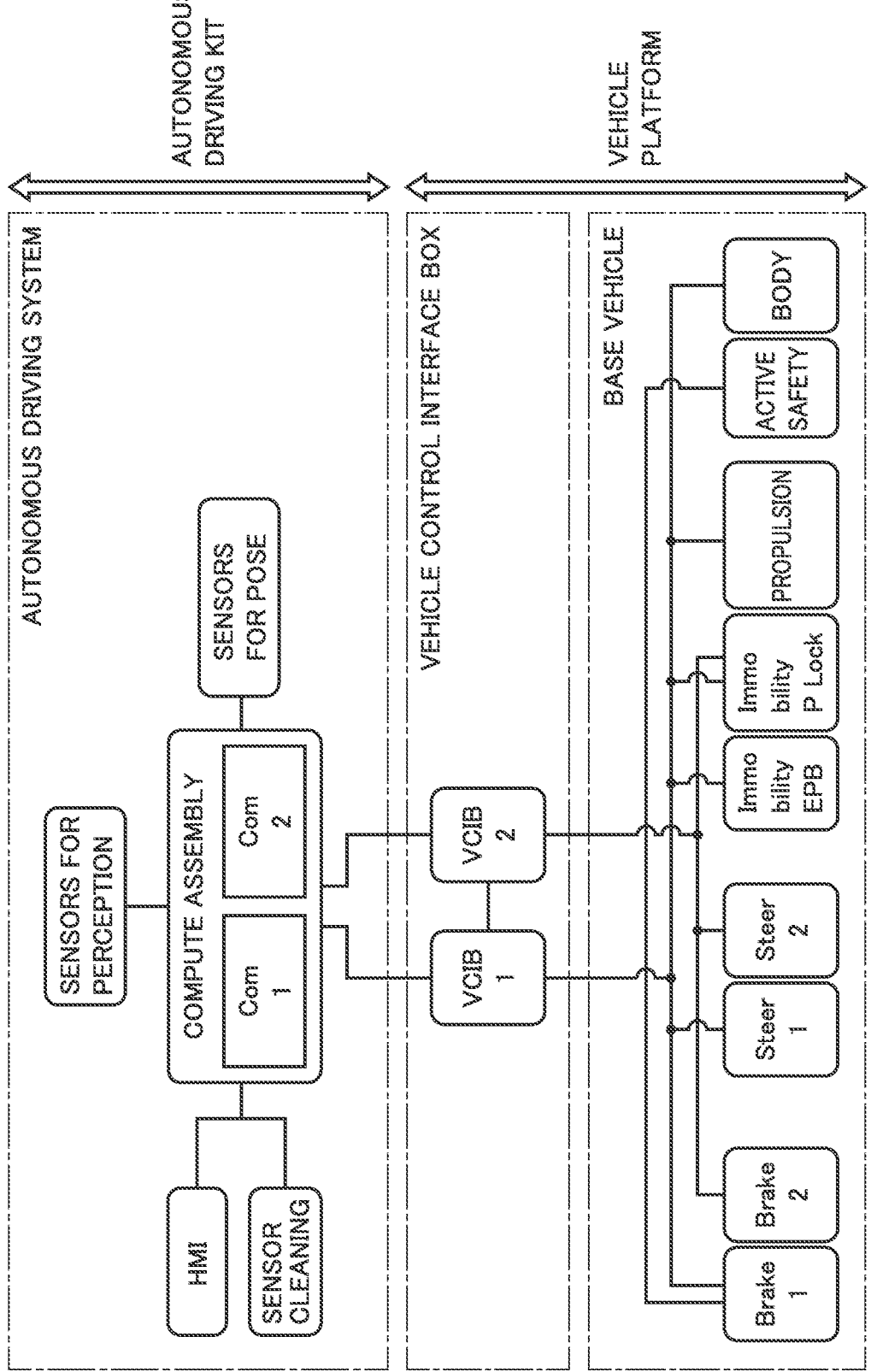
FIG. 12 is a diagram showing a system architecture of the Autono-MaaS vehicle.

System Architecture is shown in FIG. 12.

3. Application Interfaces

3.1. Typical Usage of APIs

In this section, Typical Usage of APIs is described.

A typical workflow of APIs is as follows (FIG. 13). The following example assumes CAN for physical communication.

3.2. APIs for Vehicle Motion Control

In this section, the APIs for vehicle motion control are described.

3.2.1. API List for Vehicle Motion Control

3.2.1.1. Inputs

TABLE 3

| Input APIs for vehicle motion control | | |
|---|---|---|
| Signal Name | Description | Redundancy |
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK

3.2.1.2. Outputs

TABLE 4

| Output APIs for vehicle motion control | | |
|---|---|---|
| Signal Name | Description | Redundancy |
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control
3.2.2.1. Propulsion Direction Command
Request for Shift Change from/to Forward (D Range) to/from Back (R Range)

Values

| Value | Description | Remarks |
|---|---|---|
| 0 | No Request | |
| 2 | R | Shift to R range |
| 4 | D | Shift to D range |
| other | Reserved | |

Remarks

Available only when Vehicle mode state="Autonomous Mode."
Available only when a vehicle is stationary (Traveling direction="standstill").
Available only when brake is applied.

3.2.2.2. Immobilization Command
Request for Turning On/Off WheelLock

Values

The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.
Available only when Vehicle mode state="Autonomous Mode."
Changeable only when the vehicle is stationary (Traveling direction="standstill").
Changeable only while brake is applied.

3.2.2.3. Standstill Command
Request for Applying/Releasing Brake Holding Function Values

| Value | Description | Remarks |
|---|---|---|
| 0 | No Request | |
| 1 | Applied | Brake holding function is allowed. |
| 2 | Released | |

Remarks

This API is used for choosing a status of whether the brake holding function is allowed.
Available only when Vehicle mode state="Autonomous Mode."
Acceleration Command (deceleration request) has to be continued until Standstill Status becomes "Applied".

3.2.2.4. Acceleration Command
Request for Acceleration

Values

Estimated Maximum Deceleration to Estimated Maximum Acceleration [m/s$^2$]

Remarks

Available only when Vehicle mode state="Autonomous Mode."
Acceleration (+) and deceleration (−) request based on Propulsion Direction Status direction.
The upper/lower limit will vary based on Estimated maximum deceleration and Estimated maximum acceleration.
When acceleration more than Estimated maximum acceleration is requested, the request is set to Estimated maximum acceleration.
When deceleration more than Estimated maximum deceleration is requested, the request is set to Estimated maximum deceleration.
In case where a driver operates a vehicle (over-ride), the requested acceleration may not be achieved.
When PCS simultaneously works, VP should choose minimum acceleration (maximum deceleration).

3.2.2.5. Front Wheel Steer Angle Command

Values

| Value | Description | Remarks |
|---|---|---|
| — | [unit: rad] | |

Remarks

Available only when Vehicle mode state="Autonomous Mode"
Left is positive value (+). Right is negative value (−).
Front wheel steer angle is set to value (0) when the vehicle is going straight.
This request is set as a relative value from the current one to prevent misalignment of "Front Wheel Steer Angle" from being accumulated.
The request value should be set within Front wheel steer angle rate limitation.
In case where a driver operates a vehicle (over-ride), the requested Front Wheel Steer Angle may not be achieved.

3.2.2.6. Vehicle Mode Command
Request for Changing from/to Manual Mode to/from Autonomous Mode Values

| Value | Description | Remarks |
|---|---|---|
| 0 | No Request | |
| 1 | Request For Autonomy | |
| 2 | Deactivation Request | means transition request to manual mode |

3.2.2.7. High Dynamics Command

If ADK would like to increase braking response performance* of VP, High Dynamics Command should be set to "High".

*Reaction time in VP upon a request from ADK.

Values

| Value | Description | Remarks |
|---|---|---|
| 0 | No Request | |
| 1 | High | |
| 2-3 | Reserved | |

Remarks

N/A

3.2.2.8. Propulsion Direction Status

Current Shift Status

Values

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each Immobilization System Status

Values

The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A

3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks

N/A

3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.
When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.
When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.
When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front Wheel Steer Angle Rate

Values

| Value | Description | Remarks |
|---|---|---|
| Minimum Value | Invalid value | |
| others | [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The Limit of the Front Wheel Steer Angle Rate

Values

[unit: rad/s]

Remarks

Figure 14:
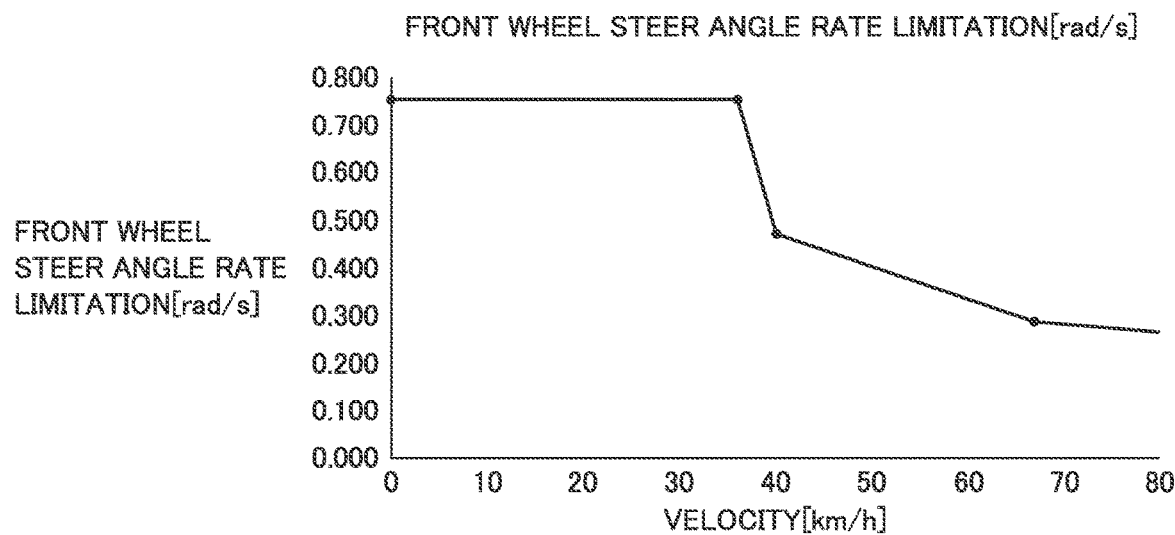
FIG. 14 is a diagram showing relation between a front wheel steer angle rate limitation and a velocity.

The limitation is calculated from the "vehicle speed—steering angle rate" map as shown in following Table 5 and FIG. 14.
  A) At a low speed or stopped situation, use fixed value (0.751 [rad/s]).
  B) At a higher speed, the steering angle rate is calculated from the vehicle speed using 3.432 m/s$^3$.

TABLE 5

"vehicle speed - steering angle rate" map

| Velocity [km/h] | 0.0 | 36.0 | 40.0 | 67.0 | 84.0 |
|---|---|---|---|---|---|
| Front Wheel Steer Angle Rate Limitation [rad/s] | 0.751 | 0.751 | 0.469 | 0.287 | 0.253 |

3.2.2.17. Estimated Maximum Lateral Acceleration

Values

[unit: m/s$^2$] (fixed value: 3.432)

Remarks

Maximum lateral acceleration defined for VP.

3.2.2.18. Estimated Maximum Lateral Acceleration Rate

Values

[unit: m/s$^3$] (fixed value: 3.432)

Remarks

Maximum lateral acceleration rate defined for VP.

3.2.2.19. Intervention of Accelerator Pedal

This signal shows whether the accelerator pedal is depressed by a driver (intervention).

Values

| Value | Description | Remarks |
|---|---|---|
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

Values

| Value | Description | Remarks |
|---|---|---|
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

Values

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of Shift Lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A

3.2.2.23. Wheel Speed Pulse (Front Left), Wheel Speed Pulse (Front Right), Wheel Speed Pulse (Rear Left), Wheel Speed Pulse (Rear Right)

Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

Values

| Value | Description | Remarks |
|---|---|---|
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving Direction of Vehicle

Values

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated Longitudinal Velocity of Vehicle

Values

| Value | Description | Remarks |
|---|---|---|
| Maximum Value in transmission bits | Invalid value | The sensor is invalid. |
| others | Velocity [unit: m/s] | |

The value of this signal is a positive value when both forward direction and reverse direction.

3.2.2.27. Longitudinal Acceleration

Estimated Longitudinal Acceleration of Vehicle

Values

| Value | Description | Remarks |
|---|---|---|
| Minimum Value in transmission bits | Invalid value | The sensor is invalid. |
| others | Acceleration [unit: m/s²] | |

Remarks

Acceleration (+) and deceleration (−) value based on Propulsion Direction Status direction.

3.2.2.28. Lateral Acceleration

Lateral Acceleration of Vehicle

Values

| Value | Description | Remarks |
|---|---|---|
| Minimum Value in transmission bits | Invalid value | The sensor is invalid. |
| others | Acceleration [unit: m/s²] | |

Remarks

A positive value shows counterclockwise. A negative value shows clockwise.

3.2.2.29. Yaw Rate

Sensor Value of Yaw Rate

Values

| Value | Description | Remarks |
|---|---|---|
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of Tire Glide/Spin/Skid

Values

| Value | Description | Remarks |
|---|---|---|
| 0 | Not Slipping | |
| 1 | Slipping | |
| 2 | Reserved | |
| 3 | Invalid value | |

Remarks

This signal is determined as "Slipping" when any of the following systems has been activated.
- ABS (Anti-lock Braking System)
- TRC (TRaction Control)
- VSC (Vehicle Stability Control)
- VDIM (Vehicle Dynamics Integrated Management)

3.2.2.31. Vehicle Mode State

Autonomous or Manual Mode

Values

| Value | Description | Remarks |
|---|---|---|
| 0 | Manual Mode | The mode starts from Manual mode. |
| 1 | Autonomous Mode | |

Remarks

The initial state is set to "Manual Mode."

3.2.2.32. Readiness for Autonomization

This signal shows whether a vehicle can change to autonomous mode or not

Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks

N/A

3.2.2.33. Failure Status of VP Functions for Autonomous Mode

This signal is used to show whether VP functions have some failures mode when a vehicle works as Autonomous Mode.

Values

| Value | Description | Remarks |
|---|---|---|
| 0 | No fault | |
| 1 | Fault | |
| 3 | Invalid | The status is not determined yet. |

Remarks

N/A
3.2.2.34. PCS Alert Status

Values

| Value | Description | Remarks |
|---|---|---|
| 0 | Normal | |
| 1 | Alert | Request alert from PCS system |
| 3 | Unavailable | |

Remarks

N/A
3.2.2.35. PCS Preparation Status
Prefill Status as the Preparation of PCS Brake Values

| Value | Description | Remarks |
|---|---|---|
| 0 | Normal | |
| 1 | Active | |
| 3 | Unavailable | |

Remarks

"Active" is a status in which PCS prepares brake actuator to shorten the latency from a deceleration request issued by PCS.
When a value turns to "Active" during Vehicle mode state="Autonomous Mode," "ADS/PCS arbitration status" shows "ADS".

3.2.2.36. PCS Brake/PCS Brake Hold Status

Values

| Value | Description | Remarks |
|---|---|---|
| 0 | Normal | |
| 1 | PCS Brake | |
| 2 | PCS Brake Hold | |
| 7 | Unavailable | |

Remarks

N/A
3.2.2.37. ADS/PCS Arbitration Status
Arbitration Status

Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS".
When acceleration requested by PCS system in VP is larger than one requested by ADS, the status is set as "ADS".

3.3. APIs for BODY Control
3.3.1. API List for BODY Control
3.3.1.1. Inputs

TABLE 6

| Input APIs for BODY Control | | |
|---|---|---|
| Signal Name | Description | Redundancy |
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |

TABLE 6-continued

Input APIs for BODY Control

| Signal Name | Description | Redundancy |
| --- | --- | --- |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
| --- | --- | --- |
| Turnsignal status | Status of the current turnsignallight mode of the vehicle platform | N/A |
| Headlight status | Status of the current headlight mode of the vehicle platform | N/A |
| Hazardlight status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control

3.3.2.1. Turnsignal Command
Request to Control Turn-Signal

Values

| Value | Description | Remarks |
|---|---|---|
| 0 | OFF | |
| 1 | Right | Right blinker ON |
| 2 | Left | Left blinker ON |
| 3 | Reserved | |

Remarks

N/A

3.3.2.2. Headlight Command
Request to Control Headlight

Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."
Driver operation overrides this command.

3.3.2.3. Hazardlight Command
Request to Control Hazardlight

Values

| Value | Description | Remarks |
|---|---|---|
| 0 | No Request | |
| 1 | ON | |

Remarks

Driver operation overrides this command.
Hazardlight is ON while receiving "ON" command.

3.3.2.4. Horn Pattern Command
Request to Choose a Pattern of ON-Time and OFF-Time Per Cycle

Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A

3.3.2.5. Horn Cycle Command
Request to Choose the Number of ON and OFF Cycles

Values 0 to 7 [-]

Remarks

N/A

3.3.2.6. Continuous Horn Command
Request to Turn On/Off Horn

Values

| Value | Description | Remarks |
|---|---|---|
| 0 | No request | |
| 1 | ON | |

Remarks

This command's priority is higher than 3.3.2.4 Horn pattern and 3.3.2.5 Horn cycle command.
Horn is "ON" while receiving "ON" command.

3.3.2.7. Front Windshield Wiper Command
Request to Control Front Windshield Wiper

Values

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks

This command is valid when front windshield wiper mode on a combination switch is "OFF" or "AUTO".
Driver input overrides this command.
Windshieldwiper mode is kept while receiving a command.
Wiping speed of intermittent mode is fixed.

3.3.2.8. Rear Windshield Wiper Command
Request to Control Rear Windshield Wiper Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks

Driver input overrides this command
Windshieldwiper mode is kept while receiving a command.
Wiping speed of intermittent mode is fixed.

3.3.2.9. HVAC (1st Row) Operation Command
Request to Start/Stop 1st Row Air Conditioning Control Values

| Value | Description | Remarks |
|---|---|---|
| 0 | No request | |
| 1 | ON | |
| 2 | OFF | |

Remarks

N/A

3.3.2.10. HVAC (2nd Row) Operation Command
Request to Start/Stop 2nd Row Air Conditioning Control Values

| Value | Description | Remarks |
|---|---|---|
| 0 | No request | |
| 1 | ON | |
| 2 | OFF | |

Remarks

N/A

3.3.2.11. Target Temperature (1st Left) Command
Request to Set Target Temperature in Front Left Area Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.12. Target Temperature (1st Right) Command
Request to Set Target Temperature in Front Right Area.

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.13. Target Temperature (2nd Left) Command
Request to Set Target Temperature in Rear Left Area Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.14. Target Temperature (2nd Right) Command
Request to Set Target Temperature in Rear Right Area Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.15. HVAC Fan (1st Row) Command
Request to Set Fan Level of Front AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC Fan (2nd Row) Command

Request to Set Fan Level of Rear AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command

Request to Set 1st Row Air Outlet Mode

Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

N/A

3.3.2.18. Air Outlet (2nd Row) Command

Request to Set 2nd Row Air Outlet Mode

Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks

N/A

3.3.2.19. Air Recirculation Command

Request to Set Air Recirculation Mode

Values

| Value | Description | Remarks |
|---|---|---|
| 0 | No request | |
| 1 | ON | |
| 2 | OFF | |

Remarks

N/A

3.3.2.20. AC Mode Command

Request to Set AC Mode

Values

| Value | Description | Remarks |
|---|---|---|
| 0 | No request | |
| 1 | ON | |
| 2 | OFF | |

Remarks

N/A

3.3.2.21. Turnsignal Status

Values

| Value | Description | Remarks |
|---|---|---|
| 0 | OFF | |
| 1 | Left | |
| 2 | Right | |
| 3 | Invalid | |

Remarks

N/A

3.3.2.22. Headlight Status

Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

3.3.2.23. Hazardlight Status

Values

| Value | Description | Remarks |
|---|---|---|
| 0 | OFF | |
| 1 | Hazard | |
| 2 | Reserved | |
| 3 | Invalid | |

Remarks

N/A

3.3.2.24. Horn Status

Values

| Value | Description | Remarks |
|---|---|---|
| 0 | OFF | |
| 1 | ON | |
| 2 | Reserved | |
| 3 | Invalid | |

Remarks

In the case that 3.3.2.4 the Horn Pattern Command is active, the Horn status is "1" even if there are OFF periods in some patterns.

3.3.2.25. Front Windshield Wiper Status

Values

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks

N/A

3.3.2.26. Rear Windshield Wiper Status

Values

| Value | Description | Remarks |
|---|---|---|
| 0 | OFF | |
| 1 | Lo | |
| 2 | Reserved | |
| 3 | INT | |
| 4-5 | Reserved | |
| 6 | Fail | |
| 7 | Invalid | |

Remarks

N/A

3.3.2.27. HVAC (1st Row) Status

Values

| Value | Description | Remarks |
|---|---|---|
| 0 | OFF | |
| 1 | ON | |

Remarks

N/A

3.3.2.28. HVAC (2nd Row) Status

Values

| Value | Description | Remarks |
|---|---|---|
| 0 | OFF | |
| 1 | ON | |

Remarks

N/A

3.3.2.29. Target Temperature (1st Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.30. Target Temperature (1st Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

3.3.2.31. Target Temperature (2nd Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.32. Target Temperature (2nd Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.33. HVAC Fan (1st Row) Status

Values

| Value | Description | Remarks |
|---|---|---|
| 0 | OFF | |
| 1 to 7 | Fan Level | |
| 8 | Undefined | |

Remarks

N/A

3.3.2.34. HVAC Fan (2nd Row) Status

Values

| Value | Description | Remarks |
|---|---|---|
| 0 | OFF | |
| 1 to 7 | Fan Level | |
| 8 | Undefined | |

Remarks

N/A

3.3.2.35. Air Outlet (1st Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks

N/A

3.3.2.36. Air Outlet (2nd Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A

3.3.2.37. Air Recirculation Status

Values

| Value | Description | Remarks |
|---|---|---|
| 0 | OFF | |
| 1 | ON | |

Remarks

N/A

3.3.2.38. AC Mode Status

Values

| Value | Description | Remarks |
|---|---|---|
| 0 | OFF | |
| 1 | ON | |

3.3.2.39. Seat Occupancy (1st Right) Status

Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.41. Seat Belt (1st Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A

3.3.2.42. Seat Belt (2nd Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.43. Seat Belt (2nd Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.44. Seat Belt (3rd Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.45. Seat Belt (3rd Center) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.3.2.46. Seat Belt (3rd Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure

3.4. APIs for Power Control
3.4.1. API List for Power Control
3.4.1.1. Inputs

TABLE 8

Input APIs for Power control

| Signal Name | Description | Redundancy |
|---|---|---|
| Power mode command | Command to control the power mode of VP | N/A |

3.4.1.2. Outputs

TABLE 9

Output APIs for Power control

| Signal Name | Description | Redundancy |
|---|---|---|
| Power mode status | Status of the current power mode of VP | N/A |

3.4.2. Details of Each API for Power Control
3.4.2.1. Power Mode Command Request to Control Power Mode Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Remarks

Figure 15:
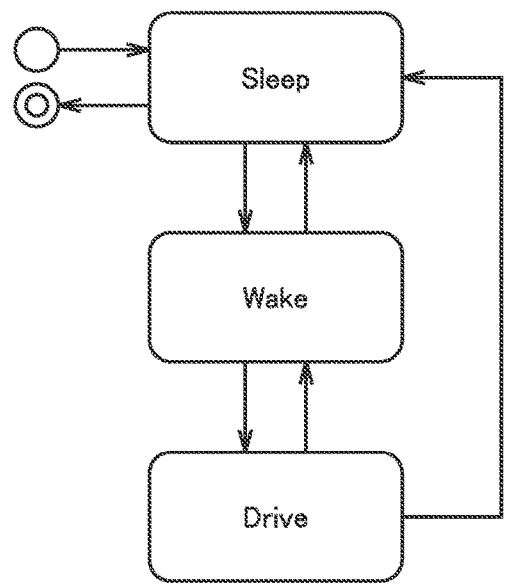
FIG. 15 is a state machine diagram of the power mode.

The state machine diagram of the power modes is shown in FIG. 15.

[Sleep]

Vehicle power off condition. In this mode, the main battery does not supply power to each system, and neither VCIB nor other VP ECUs are activated.

[Wake]

VCIB is awake by the auxiliary battery. In this mode, ECUs other than VCIB are not awake except for some of the body electrical ECUs.

[Driving Mode]

Vehicle power on condition. In this mode, the main battery supplies power to the whole VP and all the VP ECUs including VCIB are awake.

3.4.2.2. Power Mode Status

Values

| Value | Description | Remarks |
|---|---|---|
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks

VCIB will transmit [Sleep] as Power_Mode_Status continuously for 3000 [ms] after executing the sleep sequence. And then, VCIB will shut down.

ADS should stop transmitting signals to VCIB while VCIB is transmitting [Sleep].

3.5. APIs for Failure Notification
3.5.1. API List for Failure Notification
3.5.1.1. Inputs

TABLE 10

Input APIs for Failure Notification

| Signal Name | Description | Redundancy |
|---|---|---|
| N/A | N/A | N/A |

3.5.1.2. Outputs

TABLE 11

Output APIs for Failure Notification

| Signal Name | Description | Redundancy |
|---|---|---|
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of Each API for Failure Notification
3.5.2.1. Request for ADS Operation Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks

This signal shows a behavior which the ADS is expected to do according to a failure which happened in the VP.

3.5.2.2. Impact Detection Signal

Values

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
|---|---|---|
| 0 | Normal | — |
| 1 | Deterioration detected | — |

Remarks

N/A

3.5.2.4. Performance Deterioration of Propulsion System

Values

| Value | Description | Remarks |
|---|---|---|
| 0 | Normal | — |
| 1 | Deterioration detected | — |

Remarks

N/A

3.5.2.5. Performance Deterioration of Shift Control System

Values

| Value | Description | Remarks |
|---|---|---|
| 0 | Normal | — |
| 1 | Deterioration detected | — |

Remarks

N/A

3.5.2.6. Performance Deterioration of Immobilization System

Values

| Value | Description | Remarks |
|---|---|---|
| 0 | Normal | — |
| 1 | Deterioration detected | — |

Remarks

N/A

3.5.2.7. Performance Deterioration of Steering System

Values

| Value | Description | Remarks |
|---|---|---|
| 0 | Normal | — |
| 1 | Deterioration detected | — |

3.5.2.8. Performance Deterioration of Power Supply System

Values

| Value | Description | Remarks |
|---|---|---|
| 0 | Normal | — |
| 1 | Deterioration detected | — |

Remarks

N/A

3.5.2.9. Performance Deterioration of Communication System

Values

| Value | Description | Remarks |
|---|---|---|
| 0 | Normal | — |
| 1 | Deterioration detected | — |

Remarks

N/A

3.6. APIs for Security
3.6.1. API List for Security
3.6.1.1. Inputs

TABLE 12

| Input APIs for Security ||| |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security ||| |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security

3.6.2.1. Door Lock (Front) Command, Door Lock (Rear) Command

Values

| Value | Description | Remarks |
|---|---|---|
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command

Request to Control all Doors' Lock

Values

| Value | Description | Remarks |
|---|---|---|
| 0 | No Request | |
| 1 | Lock (all) | |
| 2 | Unlock (all) | |
| 3 | Reserved | |

Remarks

N/A

3.6.2.3. Device Authentication Signature the 1st Word, Device Authentication Signature the 2nd Word, Device Authentication Signature the 3rd Word, Device Authentication Signature the 4th Word, Device Authentication Seed the 1st Word, Device Authentication Seed the 2nd Word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.5. Door Lock (1st Right) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.6. Door Lock (2nd Left) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.7. Door Lock (2nd Right) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.8. Door Lock Status of all Doors

Values

| Value | Description | Remarks |
|---|---|---|
| 0 | Reserved | |
| 1 | All Locked | |
| 2 | Anything Unlocked | |
| 3 | Invalid | |

Remarks

In case any doors are unlocked, "Anything Unlocked."
In case all doors are locked, "All Locked."

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks

N/A

3.6.2.9.1. Trip Counter

This counter is incremented in a unit of trips by the Freshness Value management master ECU.

Values

0-FFFFh

Remarks

This value is used to create a Freshness value.
For details, please refer to the other material [the specification of Toyota's MAC module].

3.6.2.9.2. Reset Counter

This counter is incremented periodically by the Freshness Value management master ECU.

Values

0-FFFFFh

Remarks

This value is used to create a Freshness value.
For details, please refer to the other material [the specification of Toyota's MAC module].

3.6.2.10. 1st Left Door Open Status

Status of the Current 1st-Left Door Open/Close of the Vehicle Platform

Values

| Value | Description | Remarks |
|---|---|---|
| 0 | Reserved | |
| 1 | Open | |
| 2 | Closes | |
| 3 | Invalid | |

Remarks

N/A

3.6.2.11. 1st Right Door Open Status

Status of the Current 1st-Right Door Open/Close

Values

| Value | Description | Remarks |
|---|---|---|
| 0 | Reserved | |
| 1 | Open | |
| 2 | Close | |
| 3 | Invalid | |

Remarks

N/A

3.6.2.12. 2nd Left Door Open Status

Status of the Current 2nd-Left Door Open/Close

Values

| Value | Description | Remarks |
|---|---|---|
| 0 | Reserved | |
| 1 | Open | |
| 2 | Close | |
| 3 | Invalid | |

Remarks

N/A

3.6.2.13. 2nd Right Door Open Status

Status of the Current 2nd-Right Door Open/Close

Values

| Value | Description | Remarks |
|---|---|---|
| 0 | Reserved | |
| 1 | Open | |

-continued

| Value | Description | Remarks |
|---|---|---|
| 2 | Close | |
| 3 | Invalid | |

Remarks

N/A

3.6.2.14. Trunk Status

Status of the Current Trunk Door Open/Close

Values

| Value | Description | Remarks |
|---|---|---|
| 0 | Reserved | |
| 1 | Open | |
| 2 | Close | |
| 3 | Invalid | |

Remarks

N/A

3.6.2.15. Hood Open Status

Status of the Current Hood Open/Close

Values

| Value | Description | Remarks |
|---|---|---|
| 0 | Reserved | |
| 1 | Open | |
| 2 | Close | |
| 3 | Invalid | |

N/A

4. API Guides to Control Toyota Vehicles

This section shows in detail the way of using APIs for Toyota vehicles.

4.1. APIs for Vehicle Motion Control

4.1.1. API List for Vehicle Motion Control

Input and output APIs for vehicle motion control are shown in Table 14 and Table 15, respectively. Usage guides of some APIs are presented in the following sections as indicated in each table.

4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK

4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |

TABLE 15-continued

Output APIs for Vehicle Motion Control

| Signal Name | Description | Redundancy | Usage Guide |
|---|---|---|---|
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API Guides in Details for Vehicle Motion Control 4.1.2.1. Propulsion Direction Command Please refer to 3.2.2.1 for value and remarks in detail.

Figure 16:
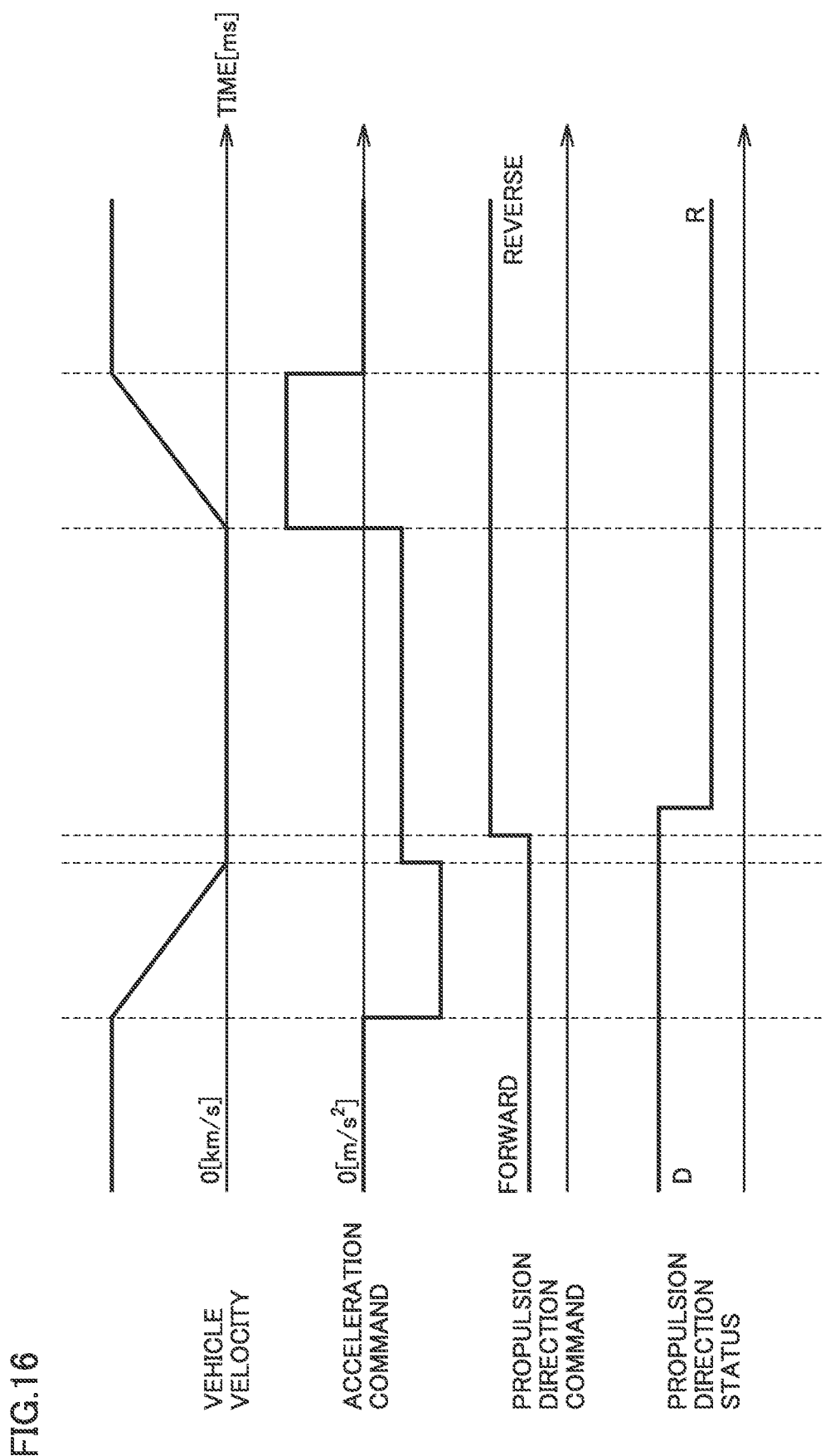
FIG. 16 is a diagram showing details of shift change sequences.

FIG. 16 shows shift change sequences in detail.

First deceleration is requested by Acceleration Command and the vehicle is stopped. When Traveling direction is set to "standstill", any shift position can be requested by Propulsion Direction Command. (In FIG. 16, "D"→"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 17:
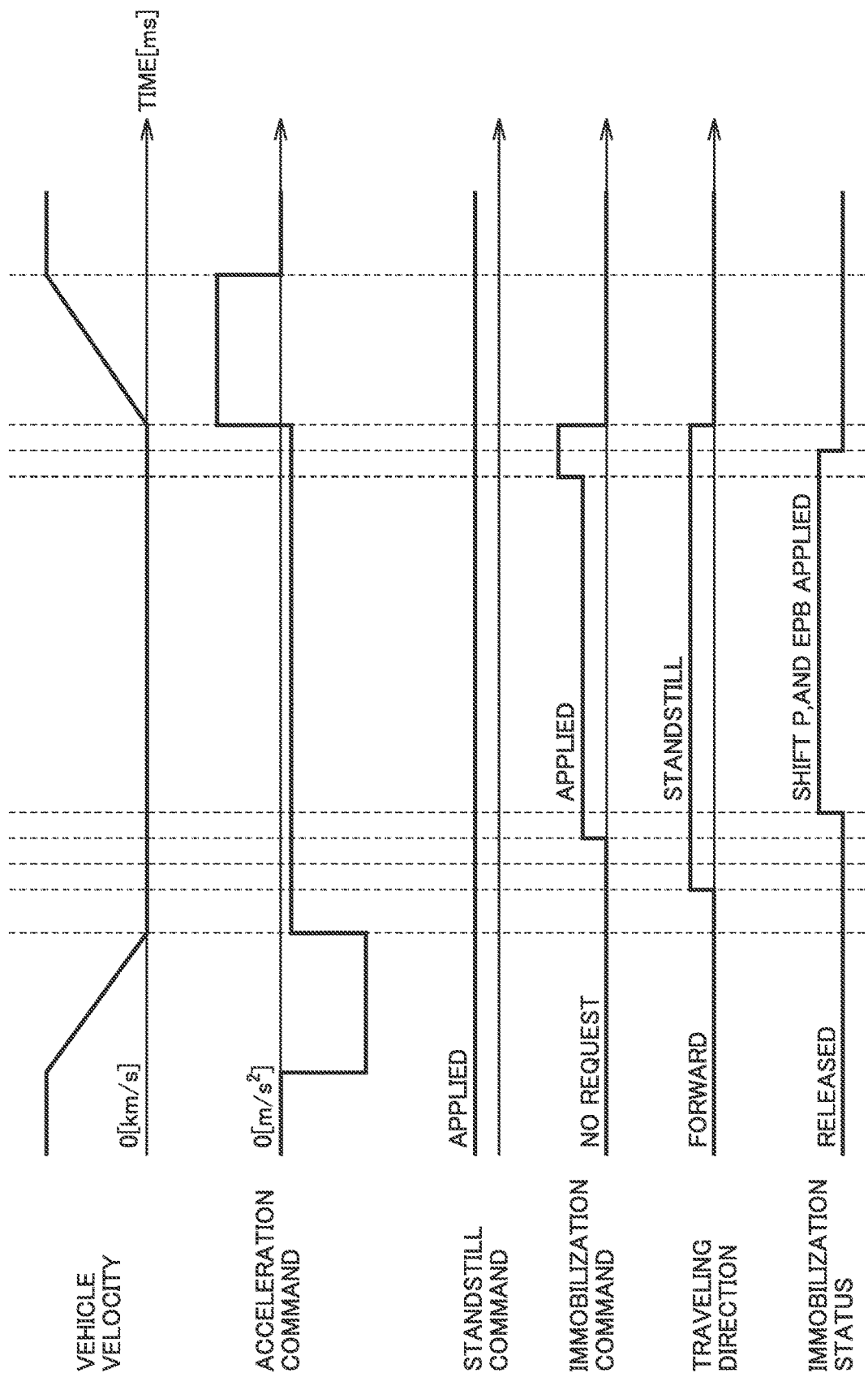
FIG. 17 is a diagram showing immobilization sequences.

FIG. 17 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

Figure 18:
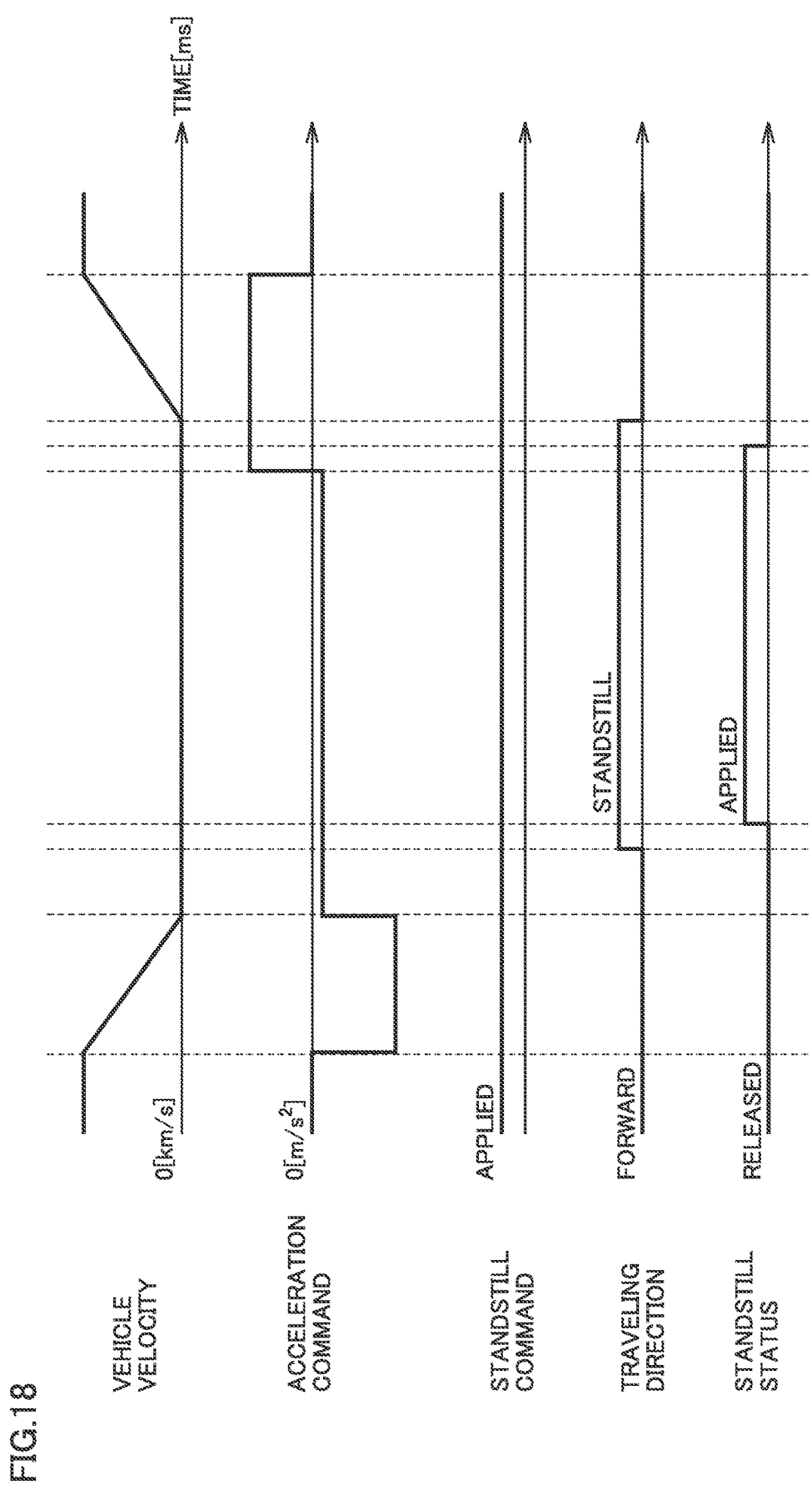
FIG. 18 is a diagram showing standstill sequences.

FIG. 18 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1 [rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 19:
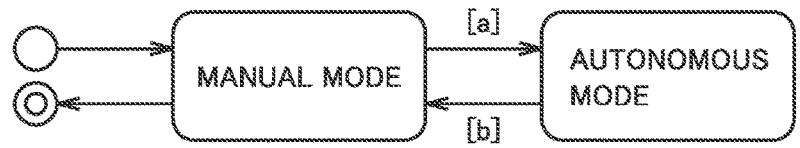
FIG. 19 is a state machine diagram of an autonomy state.

The state machine of mode transition for Autono-MaaS vehicle is shown in FIG. 19.

The explanation of each state is shown as follows.

| State | Description |
| --- | --- |
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
| --- | --- |
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control
4.2.1. API List for BODY Control
4.2.1.1. Inputs

TABLE 16

Input APIs for BODY Control

| Signal Name | Description | Redundancy | Usage Guide |
| --- | --- | --- | --- |
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |

TABLE 16-continued

Input APIs for BODY Control

| Signal Name | Description | Redundancy | Usage Guide |
|---|---|---|---|
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

Output APIs for BODY Control

| Signal Name | Description | Redundancy | Usage Guide |
|---|---|---|---|
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |

TABLE 17-continued

Output APIs for BODY Control

| Signal Name | Description | Redundancy | Usage Guide |
|---|---|---|---|
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control
4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification
4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security
4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |

TABLE 22-continued

Input APIs for Security

| Signal Name | Description | Redundancy | Usage Guide |
|---|---|---|---|
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API Guides in Details for Security

4.5.2.1. Device Authentication Protocol

Device authentication is applied when the VCIB is activated from "Sleep" mode.

After the authentication succeeds, the VCIB can start to communicate with ADK.

Figure 20:
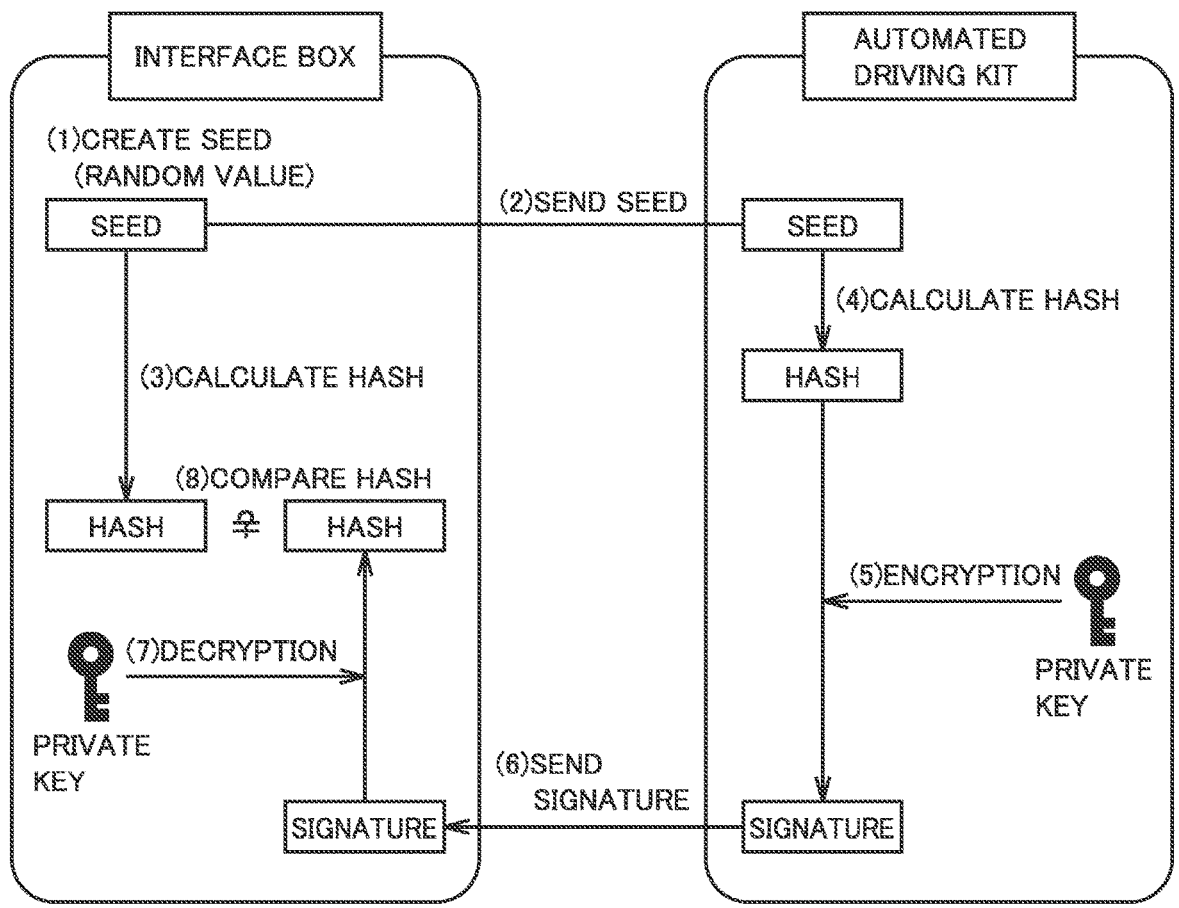
FIG. 20 is a diagram showing an authentication process.

Authentication process is as shown in FIG. 20 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle platform on which an autonomous driving system is mountable, the vehicle platform comprising:
a vehicle; and
a vehicle control interface box that interfaces between the vehicle and the autonomous driving system, wherein
the vehicle platform includes as a vehicle mode,
a manual mode in which the vehicle platform is under control by a driver, and
an autonomous mode in which the vehicle platform is under control by the autonomous driving system,
the vehicle platform includes as a power mode,
a sleep mode in which vehicle power is in an off condition,
a wake mode in which the vehicle control interface box is awake, and
a drive mode in which the vehicle power is in an on condition,
the vehicle control interface box is configured to receive, from the autonomous driving system, a vehicle mode request that requests control of the vehicle mode and to provide the autonomous driving system with a readiness-for-autonomization signal indicating whether the vehicle platform is ready for the autonomous mode, and
when the vehicle control interface box receives the vehicle mode request that requests the autonomous mode, the power mode is set to the drive mode, and the readiness-for-autonomization signal indicates readiness for the autonomous mode after the vehicle control interface box authenticates the autonomous driving system, the vehicle control interface box has the vehicle mode make transition from the manual mode to the autonomous mode.

2. The vehicle platform according to claim 1, wherein the vehicle control interface box sets the vehicle mode to the manual mode, in transition of the power mode from the sleep mode to the wake mode or the drive mode.

3. The vehicle platform according to claim 1, wherein when the vehicle control interface box receives the vehicle mode request that requests deactivation of the autonomous mode from the autonomous driving system while the vehicle mode has been set to the autonomous mode, the vehicle control interface box has the vehicle mode make transition from the autonomous mode to the manual mode.

4. An autonomous driving system configured as being mountable on a vehicle platform, the vehicle platform including a vehicle and a vehicle control interface box that interfaces between the vehicle and the autonomous driving system, the vehicle platform including as a vehicle mode, a manual mode in which the vehicle platform is under control by a driver and an autonomous mode in which the vehicle platform is under control by the autonomous driving system, the vehicle platform including as a power mode, a sleep mode in which vehicle power is in an off condition, a wake mode in which the vehicle control interface box is awake, and a drive mode in which the vehicle power is in an on condition, the autonomous driving system comprising:
a compute assembly; and
a communication module that communicates with the vehicle control interface box, wherein
the compute assembly is configured to transmit a vehicle mode request that requests control of the vehicle mode to the vehicle control interface box through the communication module, and
when the compute assembly has the vehicle mode make transition from the manual mode to the autonomous mode after the vehicle control interface box authenticates the autonomous driving system, the compute assembly transmits the vehicle mode request that requests the autonomous mode to the vehicle control interface box.

5. The autonomous driving system according to claim 4, wherein
the compute assembly is further configured to transmit a power mode request that requests control of the power mode to the vehicle control interface box through the communication module, and
when the compute assembly has the vehicle mode make transition from the manual mode to the autonomous mode, the compute assembly transmits the power mode request that requests the drive mode to the vehicle control interface box in addition to the vehicle mode request that requests the autonomous mode.

6. The autonomous driving system according to claim 5, wherein
when the compute assembly turns on the vehicle platform, the compute assembly transmits the power mode request that requests the wake mode to the vehicle control interface box.

7. The autonomous driving system according to claim 4, wherein
when the compute assembly has the vehicle mode make transition from the autonomous mode to the manual mode, the compute assembly transmits the vehicle mode request that requests deactivation of the autonomous mode to the vehicle control interface box.

8. The autonomous driving system according to claim 4, wherein
the compute assembly receives, from the vehicle control interface box through the communication module, a readiness-for-autonomization signal that indicates whether the vehicle platform is ready for the autonomous mode.

9. A vehicle control interface box that interfaces between a vehicle platform and an autonomous driving system mounted on the vehicle platform, the vehicle platform including as a vehicle mode, a manual mode in which the vehicle platform is under control by a driver and an autonomous mode in which the vehicle platform is under control by the autonomous driving system, the vehicle platform including as a power mode, a sleep mode in which vehicle power is in an off condition, a wake mode in which the vehicle control interface box is awake, and a drive mode in which the vehicle power is in an on condition, the vehicle control interface box comprising:
a processor; and
a memory in which a program executable by the processor is stored, wherein
the processor is configured to
receive a vehicle mode request that requests control of the vehicle mode from the autonomous driving system, and provide the autonomous driving system with a readiness-for-autonomization signal indicating whether the vehicle platform is ready for the autonomous mode.

10. The vehicle control interface box according to claim 9, wherein the processor is further configured to receive a power mode request that requests control of the power mode from the autonomous driving system, in transition of the vehicle mode from the manual mode to the autonomous mode, the processor authenticates the autonomous driving system, receives, from the autonomous driving system, the vehicle mode request that requests the autonomous mode and the power mode request that requests the drive mode, and provides the autonomous driving system with the readiness-for-autonomization signal indicating readiness for the autonomous mode.

11. The vehicle control interface box according to claim 9, wherein the processor is further configured to provide the autonomous driving system with a power mode status signal that indicates a status of the power mode of the vehicle platform, and in transition of the vehicle mode from the manual mode to the autonomous mode, the processor authenticates the autonomous driving system, receives the vehicle mode request that requests the autonomous mode from the autonomous driving system, and provides the autonomous driving system with the readiness-for-autonomization signal that indicates readiness for the autonomous mode and the power mode status signal that indicates the drive mode.

12. The vehicle control interface box according to claim 9, wherein in transition of the vehicle mode from the autonomous mode to the manual mode, the processor receives the vehicle mode request that requests deactivation of the autonomous mode from the autonomous driving system.

* * * * *